(12) United States Patent
Endo et al.

(10) Patent No.: US 7,199,812 B2
(45) Date of Patent: *Apr. 3, 2007

(54) LASER MARKING METHOD

(75) Inventors: Keisuke Endo, Shizuoka-ken (JP);
Hiroyuki Nishida, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/692,737

(22) Filed: Oct. 27, 2003

(65) Prior Publication Data

US 2004/0090521 A1    May 13, 2004

(30) Foreign Application Priority Data

Oct. 28, 2002 (JP) .............................. 2002-312293
Dec. 26, 2002 (JP) .............................. 2002-376855

(51) Int. Cl.
*B41J 2/435* (2006.01)
*G03C 5/00* (2006.01)
(52) U.S. Cl. ..................................... 347/224; 430/292
(58) Field of Classification Search ........ 347/224–225, 347/239–240, 241–255, 237; 430/62, 9, 430/270.1, 271.1, 292, 269, 270.11, 297, 430/801, 945; 372/26; 219/121.6, 121.61, 219/121.65
See application file for complete search history.

(56) References Cited

U.S. PATENT DOCUMENTS 4,847,183 A    7/1989    Kruger
5,231,656 A    7/1993    Sakuma et al. ............. 378/166
5,665,502 A *  9/1997    Ohashi et al. ................. 430/62
5,940,115 A    8/1999    Nakamura et al. .......... 347/251
6,339,604 B1 * 1/2002    Smart .......................... 372/26
6,908,728 B2 * 6/2005    Endo et al. .................. 430/292
2003/0224256 A1* 12/2003    Endo et al. ..................... 430/9

FOREIGN PATENT DOCUMENTS

| EP | 1 355 191 A1 | 10/2003 |
| JP | 57-204888 | 6/1981 |
| JP | 59-005097 A | 1/1984 |
| JP | 59-019253 A | 1/1984 |
| JP | 62-034691 | 2/1987 |
| JP | 06-143669 | 5/1994 |
| JP | 2829780 B2 | 9/1998 |
| JP | 10-305377 | 11/1998 |
| JP | 2000-52069 A | 2/2000 |
| JP | 2001-047267 | 2/2001 |
| JP | 3191201 B2 | 5/2001 |

* cited by examiner

*Primary Examiner*—Hai Pham
(74) *Attorney, Agent, or Firm*—Birch, Stewart, Kolasch & Birch, LLP

(57) ABSTRACT

In a marking device, by illuminating a laser beam onto an X-ray film which is a light-photosensitive heat-developing photosensitive material, an inner portion of a surface layer is melted, a cavity is formed, and a dot, which projects a surface out in a convex shape, is formed. At this time, an illumination time of the laser beam is controlled in order to control melting of the surface layer. In the marking device, when conveying of an X-ray film is stopped, oscillation of a laser oscillating tube is continued until a predetermined period of time elapses. When stoppage is for a short time, control is carried out such that marking can be started quickly.

23 Claims, 23 Drawing Sheets

FUJI SHRHR 233 1315

FIG. 7

OUTPUT OF 100 W

| ILLUMINATION TIME (μsec) | LASER WAVELENGTH 9.2 TO 9.8 μm (9 μm BAND) | EVALUATION OF VISIBILITY | ILLUMINATION TIME (μsec) | LASER WAVELENGTH 10.2 TO 10.8 μm (10 μm BAND) | EVALUATION OF VISIBILITY |
|---|---|---|---|---|---|
| 1~20 | | × | 1~40 | | × |
| 20~25 | | ○ | 40~50 | | ○ |
| 25~35 | | ◎ | 50~60 | | △ |
| 35~50 | | △ | 60~80 | | △ |
| 50 OR MORE | | × | 80 OR MORE | | × |

FIG. 8

| ILLUMINATION TIME (μsec) | OUTPUT OF 50 W LASER WAVELENGTH 9.2 TO 9.8 μm (9 μm BAND) | EVALUATION OF VISIBILITY | ILLUMINATION TIME (μsec) | LASER WAVELENGTH 10.2 TO 10.8 μm (10 μm BAND) | EVALUATION OF VISIBILITY |
|---|---|---|---|---|---|
| 1~50 | (diagram: layers 12, 16, 14) | × | 1~80 | (diagram: layers 12, 16, 14) | × |
| 50~55 | (diagram: bump 16A, 100 μm wide, 5 μm high, on 14) | × | 80~90 | (diagram: bump 16A, 100 μm wide, 5 μm high, on 14) | × |
| 55~60 | (diagram: 16A, 16C 100 μm wide, 40 μm, 16B, 14) | △ | 90~100 | (diagram: 16A, 16C 100 μm wide, 40 μm, 16B, 14) | △ |
| 60~80 | (diagram: 16A, 16C 100 μm wide, 10 μm, 16B, 14) | × | 100~130 | (diagram: 16A, 16C 100 μm wide, 10 μm, 16B, 14) | × |
| 80 OR MORE | (diagram: 16C 150 μm wide, 14) | × | 130 OR MORE | (diagram: 16C 150 μm wide, 14) | × |

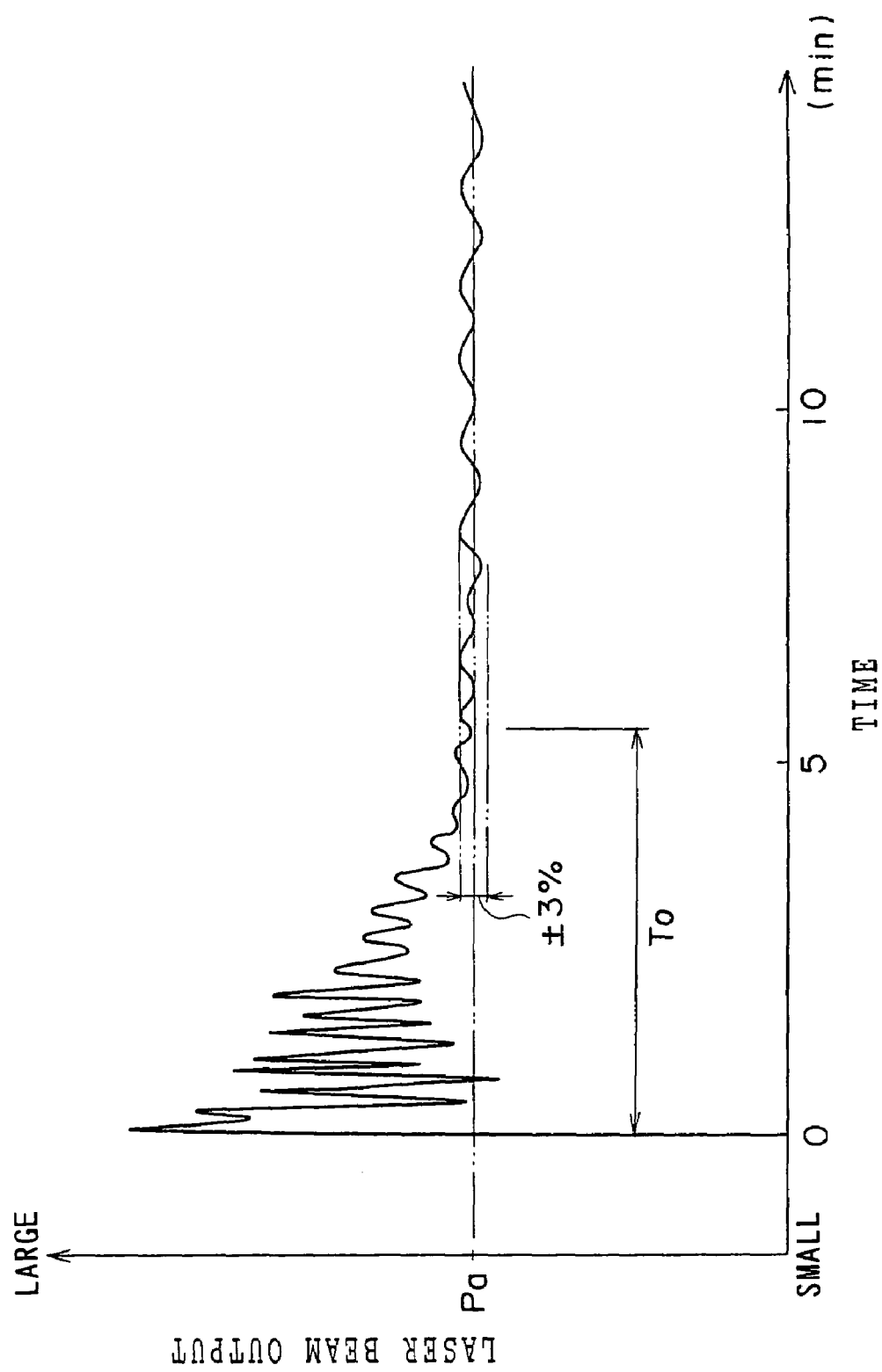

FIG. 13A
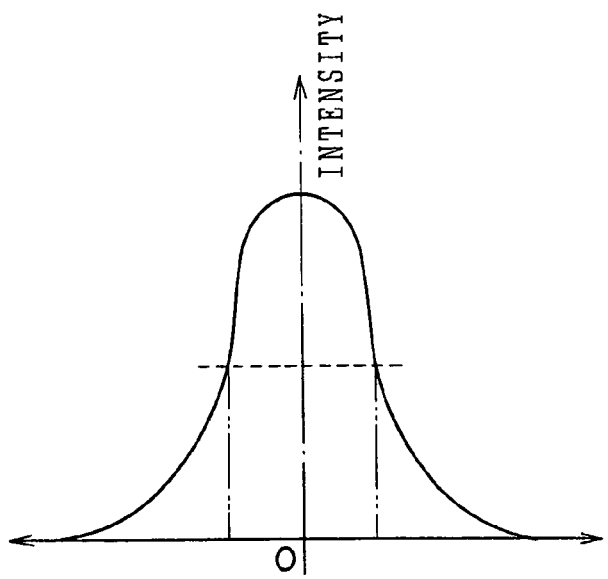
FIG. 13B
FIG. 13C
FIG. 13D
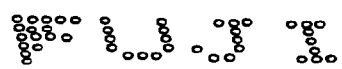

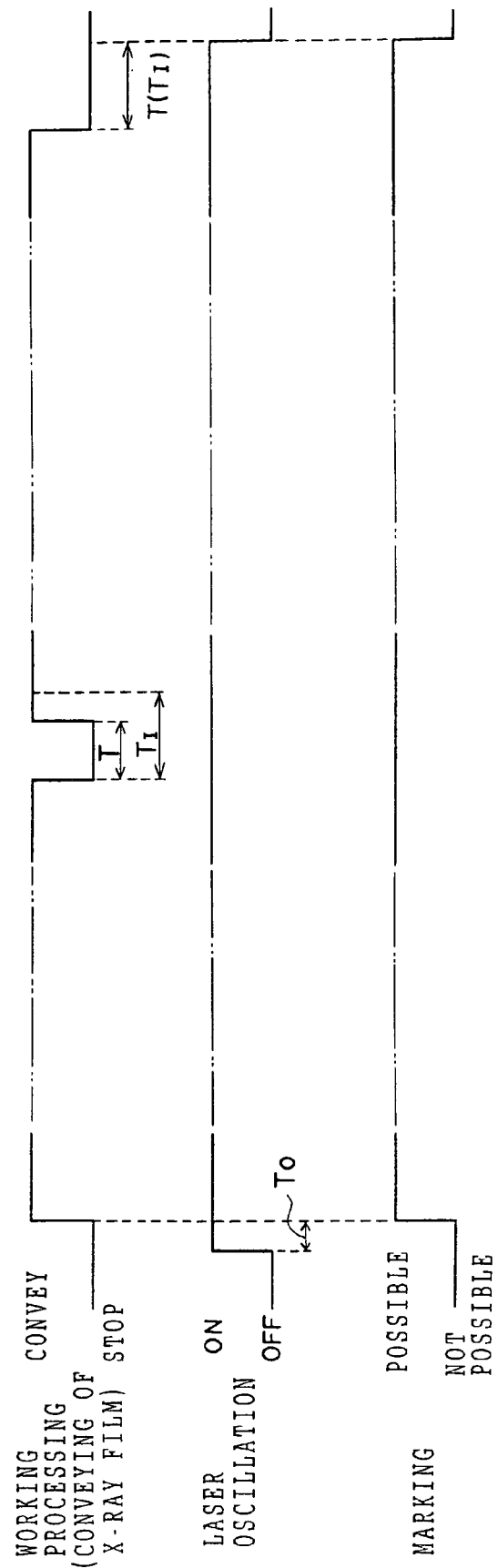

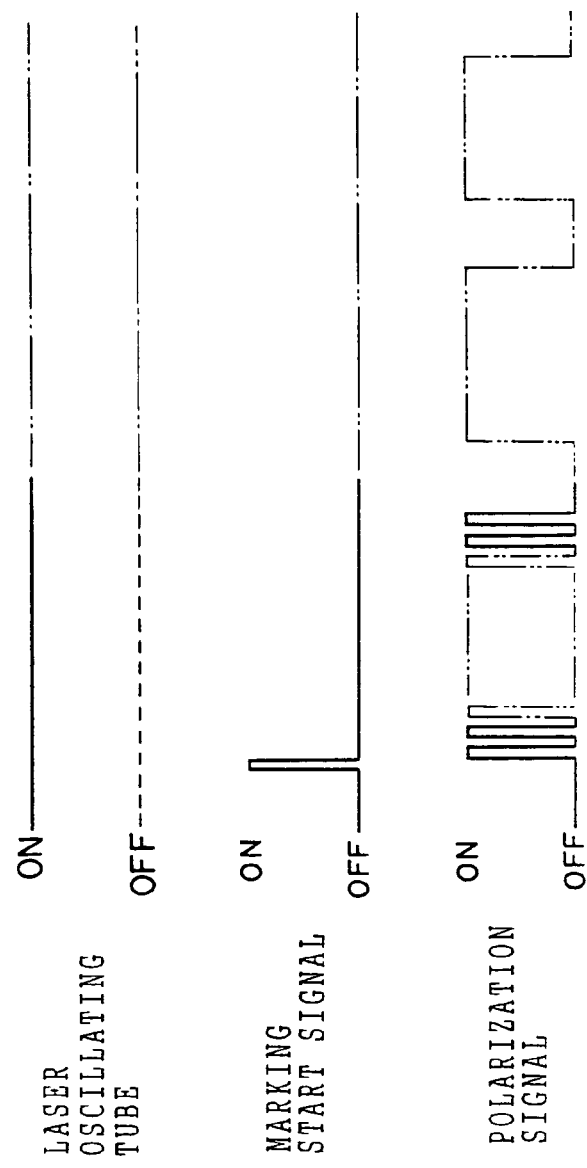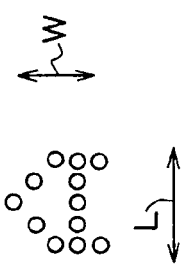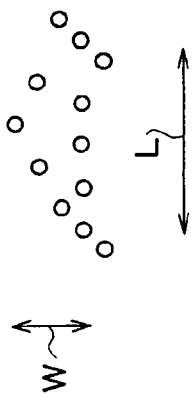

F I G. 20A
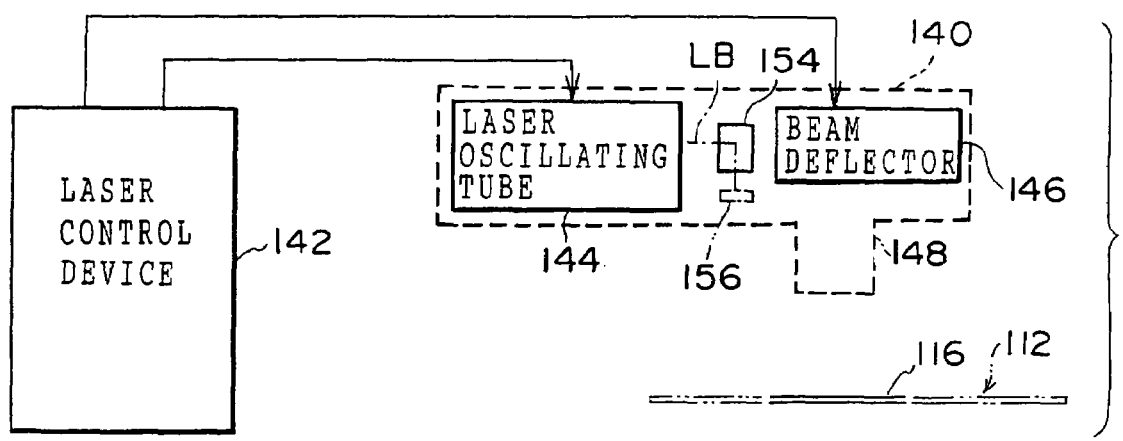
F I G. 20B
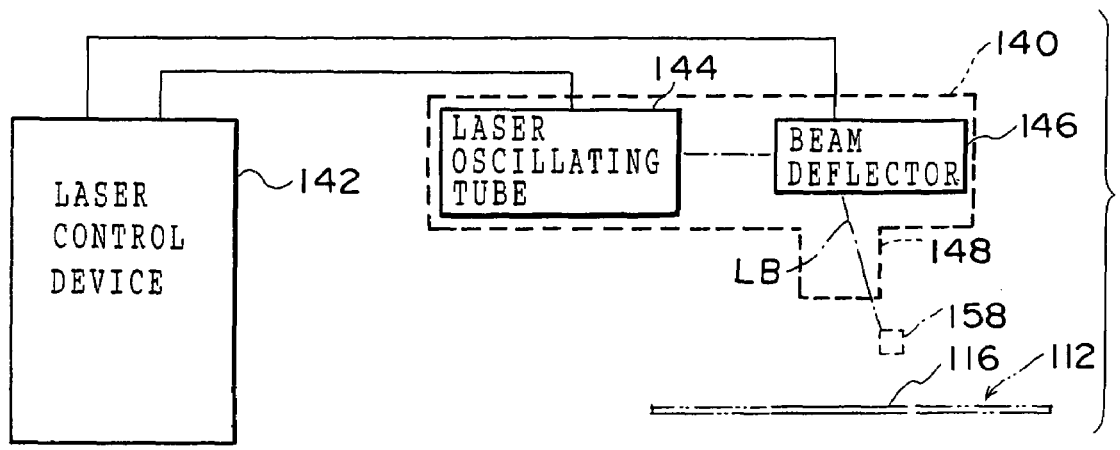

F I G. 21A
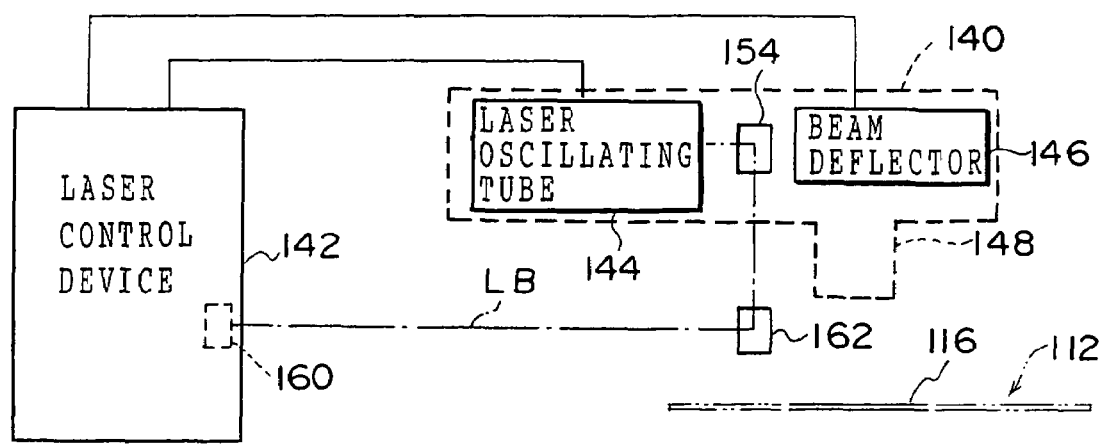
F I G. 21B
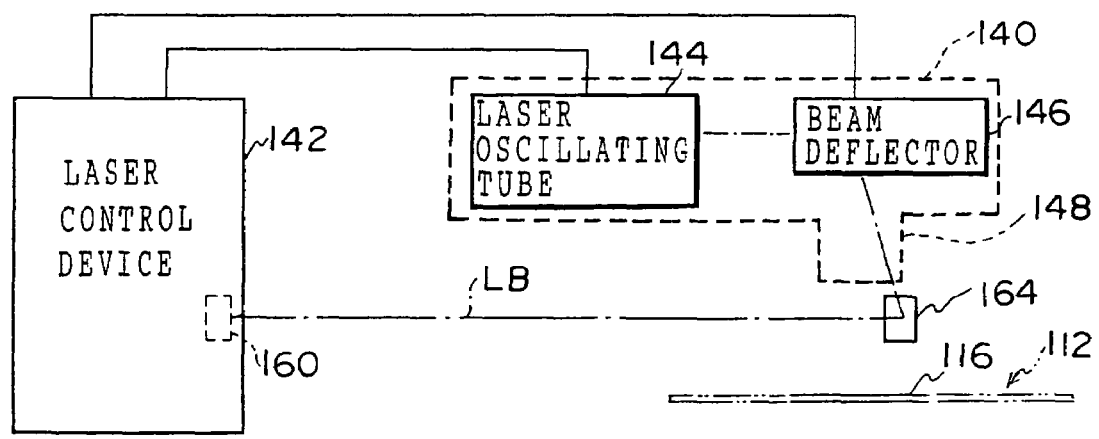

LASER MARKING METHOD

CROSS-REFERENCE TO RELATED APPLICATION

This application claims priority under 35 USC 119 from Japanese Patent Applications No. 2002-312293 and No. 2002-376855, the disclosures of which are incorporated by reference herein.

BACKGROUND OF THE INVENTION

1. Technical Field

The present invention relates to a laser marking method which forms characters or symbols by dots or an arrangement of dots formed by illuminating a laser beam, on a photosensitive material in which a surface layer including an emulsion layer is formed on the surface of a base layer. More specifically, the present invention relates to a laser marking method which forms a marking pattern such as, for example, characters or symbols, by illuminating a laser beam onto a photosensitive material which may be a light-photosensitive heat-developing photosensitive material.

2. Description of the Related Art

In medical fields in recent years, a reduction in waste solutions from processing arising when developing processing of X-ray films is carried out, has been desired from the standpoints of preserving the environment and reducing the space required for devices. Moreover, there have been provided light-photosensitive heat-developing photographic materials (light-photosensitive heat-developing photosensitive materials) for medical diagnoses and photographic technological applications which can be effectively exposed by using a laser image setter or a laser imager, and which can form a clear image having high resolution and good sharpness. In this way, in medical fields as well, attention has focused on heat-developing processing systems using such light-photosensitive heat-developing photosensitive materials.

Here, there is a marking technique which forms characters, symbols or the like by dots or an arrangement of dots formed by illuminating a laser beam onto a photosensitive material such as an X-ray film such that heat-induced fog or deformation occurs at the surface of the photosensitive material. As a condition for generating heat-induced fog or deformation which has good visibility by using such a marking technique, the illuminating of a laser beam over a relatively long period of time by using a laser oscillator of a low output of 50 W or less has been proposed. For example, refer to Japanese Patent No. 3191201.

In a so-called dry film such as an X-ray film using a light-photosensitive heat-developing photosensitive material, at the base layer which is the support, the transparency of the surface layer including the emulsion layer is of course high.

Here, in order to form a dot having high visibility by using a low-output laser oscillator, the period of time over which the laser beam is illuminated is long. Thus, at the film surface, the surface layer melts and opens up in a crater-like form, such that the PET forming the base layer is exposed. Therefore, at a highly-transparent dry film, the borders between regions at which the laser beam is not illuminated and the portions where the laser beam is illuminated and openings are formed, are not distinct. It is difficult to form dots which have sufficient visibility.

In order to avoid such a decrease in visibility, there has been proposed the use of a film in which an indication portion, which uses a dye or a pigment for indication of a pattern, is provided in advance at the film surface. Refer to, for example, Japanese Patent No. 2829780.

However, the existence of a pigment or a dye at the surface of the photosensitive material may affect the image formed on the photosensitive material. Further, in order to avoid such effects, further cost and efforts are required.

In photosensitive materials such as X-ray films for medical use, characters for example are recorded on the edge portion in order for the manufacturer, the product type, and the lot to be able to be identified. A marking technique is known in which, when characters, symbols or the like are to be recorded on a photosensitive material such as an X-ray film, laser light (a laser beam) is illuminated onto the photosensitive material, and dots are formed by heat-induced fog or deformation arising at the surface of the photosensitive material, and a marking pattern of, for example, characters or symbols, is formed by an arrangement of these dots.

As shown in FIGS. 22A and 22B for example, in an X-ray film 190, by illuminating a laser beam, melting and transpiration take place at the emulsion surface due to the energy of the laser beam. In this process, a large number of minute air bubbles arise at the interior of an emulsion layer 192 which swells, and a dot is formed.

As shown in FIG. 22A, in a highly-visible dot 194, the surface projects (is convex) due to the large number of air bubbles arising in the emulsion layer 192. The irregular reflection of the light at the border films between the large number of minute air bubbles is promoted, and becomes great in the large change in the reflected light amounts at the interior and the exterior of the dot 194.

When characters or symbols are formed by an arrangement of such dots, the dot diameter and the interval between dots must be set appropriately. Further, high visibility, i.e., a good finished quality, is required of each of the individual dots 194.

At this time, for example, when energy of an amount greater than needed is applied to the emulsion layer 192 by a laser beam, as shown in FIG. 22B, the emulsion layer 192 melts and opens, such that a dot 198, which exposes a base layer 196 which is the support, is formed.

In the case of the X-ray film 190 at which the emulsion layer 192 has high transmittance, it is not possible to visually perceive the dot 198 because it is difficult to differentiate between the emulsion layer 192 and the exposed based layer 196. Namely, the visibility of the dot 198 is extremely low, and the visibility of characters, symbols or the like formed by a dot arrangement including these dots 198 also is extremely low.

Accordingly, when forming a dot having high visibility (the dot 194) on an X-ray film by using a laser beam, the time over which the laser beam is illuminated onto the X-ray film is controlled appropriately such that proper deformation is made to occur at the X-ray film due to the energy of the laser beam.

By increasing the visibility of the individual dots in this way, the visibility of the marking pattern formed by the arrangement of dots is improved.

In a laser oscillating tube which oscillates laser light, the output peak immediately after driving begins is high. By continuing driving, the output gradually decreases. After a predetermined time elapses, the output is stabilized and the state of steady output is reached.

When forming a character by a dot arrangement or a marking pattern in which a plurality of characters are consecutively recorded by such a laser oscillating tube, the visibility of the dots or the characters formed by dot arrangements, which are formed immediately after marking begins, is extremely poor. Namely, when the laser beam is illuminated onto the photosensitive material in the state in which the output peak is high, the melting and transpiration of the emulsion layer progresses such that the base layer is exposed.

As a method of preventing the effects of the output peak which occurs immediately after the start of driving of the laser oscillating tube when marking is carried out by using a laser beam, there has been proposed a method of carrying out marking in which, when marking is carried out by pulse-driving a laser oscillating tube, driving of the laser oscillating tube is started in a state in which a shutter is closed, and thereafter, in a state in which the shutter is opened, actual marking by pulse-driving is carried out. See, for example, Japanese Patent Application Laid-Open (JP-A) No. 2000-52069.

In this way, the marking is not affected by the output peak which arises immediately after the start of driving of the laser oscillating tube, and marking using a laser beam is possible.

However, when continuously pulse-driving a laser oscillating tube, the output peak arises immediately after the start of driving. Further, at the time of driving by each driving pulse as well, first, an output peak is exhibited, and then the output gradually falls toward the output in a steady state.

Namely, when forming one character or a character array, when a laser oscillating tube is driven continuously, as shown in FIG. 23A, the output of the laser beam is extremely high immediately after the start of driving. As time passes, the output gradually decreases and is stabilized in a steady state. In contrast, when a laser oscillating tube is pulse-driven, as shown in FIG. 23B, the output peak of the laser oscillating tube which is driven by respective pulses gradually decreases. However, during the time of driving by each pulse, a variation in output occurs such that the output is highest immediately after the start of driving, and then the output suddenly falls.

When dots are formed at a photosensitive material, such a variation in output of the laser beam which is illuminated from the laser oscillating tube may result in the energy of the laser beam concentrating at one portion.

In this way, the progression of the melting and transpiration of the emulsion layer occurs and the base layer is exposed at, for example, the central portion of the dot or the like, such that deformation of the dot, a decrease in the diameter of the dot, or the like occurs. When such dots are formed, the visibility of the dots and of characters, symbols, and the like formed by an arrangement of the dots deteriorates.

SUMMARY OF THE INVENTION

The present invention was conceived of in light of the aforementioned circumstances. An object of the present invention is to provide a laser marking method which can form a marking pattern by dots or an arrangement of dots having high visibility, on a light-photosensitive heat-developing photosensitive material such as a dry film or the like, without providing a region exclusively used for indication which uses a pigment, a dye, or the like.

Another object of the present invention is to provide a laser marking method which, regardless of changes in output of a laser oscillator such as a laser oscillating tube or the like, can form, on a photosensitive material, a marking pattern formed of dots or an arrangement of dots which are high-quality and have good visibility.

In order to achieve the above objects, a method of the first aspect of the present invention includes the steps of: starting illumination of a laser beam from a laser oscillator onto a light-photosensitive heat-developing photosensitive material at which a surface layer including an emulsion layer is formed on a surface of a base layer; forming a cavity at an interior of the surface layer by heat melting the surface layer by energy of the laser beam; forming a convex portion, at which the interior of the surface layer has become a cavity, as a dot on a surface of the light-photosensitive heat-developing photosensitive material by completing illumination of the laser beam at a point in time when an illumination position of the laser beam onto the surface layer is deformed into a convex shape by the cavity; and forming a predetermined marking pattern by the dot or an arrangement of the dots.

In accordance with this invention, by illuminating the laser beam, which is oscillated by the laser oscillator, onto the surface layer of the light-photosensitive heat-developing photosensitive material and forming a dot, the marking pattern of characters, symbols or the like formed by a dot or an arrangement of dots, is formed.

Due to the laser beam being illuminated onto the surface layer of the light-photosensitive heat-developing material, the surface layer is melted by the heat received from the laser beam. At this time, the surface layer is melted from the interior thereof, such that a cavity is formed at the interior of the surface layer, deformation in a convex shape is caused at the top surface of the surface layer, and a dot is formed.

Due to the cavity being formed at the interior of the surface layer of the light-photosensitive heat-developing photosensitive material, irregular reflection of light arises at the boundary film of the cavity, and the visibility of the dot can be improved. When the melting of the surface layer progresses, the cavity swells such that the projecting height of the convex portion increases and the visibility is further improved. However, the surface layer may open and expose the base layer. At this time, if the opening is small, visual perception of the dot is possible. However, if the opening is large, the visibility of the dot greatly deteriorates, and ultimately, the dot disappears.

The melting of the surface layer of course proceeds due to the heat received from the laser beam becoming great, and proceeds due to the illumination time of the laser beam becoming long. Further, even if the illumination time is the same, the progression of the melting of the surface layer differs in accordance with the wavelength of the laser beam.

Thus, in the present invention, the heat applied to the surface layer by the laser beam is of course controlled appropriately, and the illumination time of the laser beam, from the time illumination of the laser beam starts to the time when it ends, is controlled appropriately in accordance with the wavelength of the laser beam. In this way, a cavity of an appropriate size is formed in the surface layer, and the top surface of the surface layer deforms in a convex shape of an appropriate height, such that a dot having high visibility is obtained.

In the present invention, in order to make the illumination time of the laser beam short, there are cases in which a laser beam whose wavelength is in the 9 µm band is used rather than a laser beam whose wavelength is in the 10 µm band. Further, there are cases in which a laser oscillator having a higher oscillation output is used.

Moreover, in the present invention, illumination of the laser beam may be completed during the time until the projecting height of the convex portion which forms the dot, with respect to the top surface of the surface layer, is 10 µm or more, and in actuality, is up to 50 µm.

When the projecting height of the convex portion formed at the surface layer is low, the visibility as a dot deteriorates. In particular, the visibility of the dot when viewed at an angle with respect to the top surface of the surface layer is poor. Therefore, there are cases in which the projecting height of the convex portion is made to be 10 µm or more.

Further, when the projecting height of the convex portion is high, the melting of the surface layer progresses. The top portion of the convex portion thereby opens and the base layer is exposed. At this time, when the projecting height is 50 µm or less, exposure of the base layer is suppressed, and it is possible to suppress difficulty of visual recognition of the dot when viewing the surface layer from above.

A method of a second aspect of the present invention for achieving the above-described objects is a laser marking method of forming, on a photosensitive material, a marking pattern of characters, symbols, a character array in which characters or symbols or the like are continuous, or the like, by an arrangement of dots formed by illuminating laser light, which is oscillated by a laser oscillator, while conveying the photosensitive material, the method comprising the steps of: starting oscillation of the laser light by the laser oscillator before illumination of the laser light onto the photosensitive material; and after an oscillation output of the laser oscillator is stabilized, forming the marking pattern on the photosensitive material by illuminating the laser light onto the photosensitive material while deflecting the laser light by a deflector in accordance with the marking pattern.

In accordance with this invention, before the laser light is illuminated onto the photosensitive material and the dot is formed, the laser oscillator is driven and oscillation of the laser light is started. The laser light is illuminated onto the photosensitive material in a state in which the oscillation output of the laser oscillator is stable.

At this time, by deflecting the laser light by the deflector, dots corresponding to the marking pattern are formed on the photosensitive material.

In this way, the respective dots forming the marking pattern can be recorded onto the photosensitive material at a uniform quality. Therefore, a marking pattern having high visibility can be formed on the photosensitive material. Note that, from the time that oscillation of the laser light by the laser oscillator is started to the time when the oscillation output is stabilized, it suffices to not illuminate the laser light onto the photosensitive material, and to illuminate the laser light onto a given portion which is set in advance at the interior or the exterior of the device or the like, e.g., a damper or the like.

Further, the method of the second aspect of the present invention may be a laser marking method of forming, on a photosensitive material, a marking pattern of characters, symbols, a character array in which characters or symbols or the like are continuous, or the like, by an arrangement of dots formed by illuminating laser light, which is oscillated by a laser oscillator, while conveying the photosensitive material, the method comprising the steps of: starting conveying of the photosensitive material at a predetermined timing after starting oscillation of the laser light by the laser oscillator; and forming the marking pattern on the photosensitive material by illuminating the laser light onto the photosensitive material while deflecting the laser light by a deflector in accordance with the marking pattern.

In accordance with this invention, after oscillation of the laser light by the laser oscillator is started, conveying of the photosensitive material is started. In this way, the laser light can be illuminated onto the photosensitive material and the dots can be formed in the state in which the oscillation output of the laser oscillator is stable. Therefore, a marking pattern having high visibility can be formed on the photosensitive material.

In this invention, the timing for starting the conveying of the photosensitive material can be the time until the output of the laser light oscillated by the laser oscillator is stable.

Further, in the present invention, the timing for starting the conveying of the photosensitive material can be the time when the output of the laser light oscillated by the laser oscillator is stable, before a predetermined position of the photosensitive material reaches the illumination position of the laser light. In both of these cases, at the time when the laser light is illuminated onto the photosensitive material, the oscillation output of the laser oscillator can be made to be in a stable state.

Further, in the present invention, the timing for starting the conveying of the photosensitive material may be a time which is set in advance on the basis of changes in the output of the laser oscillator. Or, the laser light oscillated by the laser oscillator may be detected, and the timing for starting the conveying of the photosensitive material may be judged on the basis of the results of detection.

Moreover, the second aspect of the present invention may include a step of, after a predetermined period of time elapses from the stoppage of conveying of the photosensitive material, stopping oscillation of the laser light by the laser oscillator.

In accordance with this invention, when conveying of the photosensitive material is stopped for example, if this stoppage time is relatively short, oscillation of the laser oscillator is continued.

In this way, if the interruption is short, by starting conveying of the photosensitive material, marking onto the photosensitive material is possible. Therefore, the production efficiency can be prevented from deteriorating.

BRIEF DESCRIPTION OF THE DRAWINGS

FIG. 7 is an evaluation diagram showing results of evaluation and summaries of dot configurations with respect to illuminating times of laser beams of different wavelength bands, by using a laser oscillator having an oscillation output of 100 W.

FIG. 8 is an evaluation diagram showing results of evaluation and summaries of dot configurations with respect to illuminating times of laser beams of different wavelength bands, by using a laser oscillator having an oscillation output of 50 W.

FIG. 12 is a graph showing a summary of variations in output of a laser oscillating tube accompanying the passage of time.

FIG. 13A is a graph showing variations in intensity of the laser beam in a state in which output is stabilized.

FIG. 13B is a graph showing an example of variations in intensity of a laser beam before output is stabilized.

FIG. 13C is a schematic diagram showing an example of a dot arrangement formed in a state in which output of the laser beam is stabilized.

FIG. 13D is a schematic diagram showing an example of a dot arrangement formed before output of the laser beam is stabilized.

FIG. 18 is a graph showing an example of working processings of an X-ray film, driving of a laser oscillating tube, and the timing of the on-off of marking, accompanying the passage of time.

FIG. 19A is a graph showing an example of the operational state of the laser oscillating tube at the time of working processing an X-ray film, and timing of a deflection signal with respect to a marking signal.

FIG. 19B is a schematic diagram showing an example of changes in an illumination position of the laser beam based on the deflection signal.

FIG. 19C is a schematic diagram of a dot arrangement formed on an X-ray film by changing the illumination position of FIG. 19B.

FIGS. 20A and 20B are schematic diagrams of a marking head respectively showing other examples of the illumination position of the laser beam at the time of non-marking.

FIGS. 21A and 21B are schematic diagrams of a vicinity of the marking head respectively showing examples of the illumination position of the laser beam at the time of non-marking, which examples are different than those of FIGS. 20A and 20B.

DETAILED DESCRIPTION OF THE INVENTION

Figure 1:
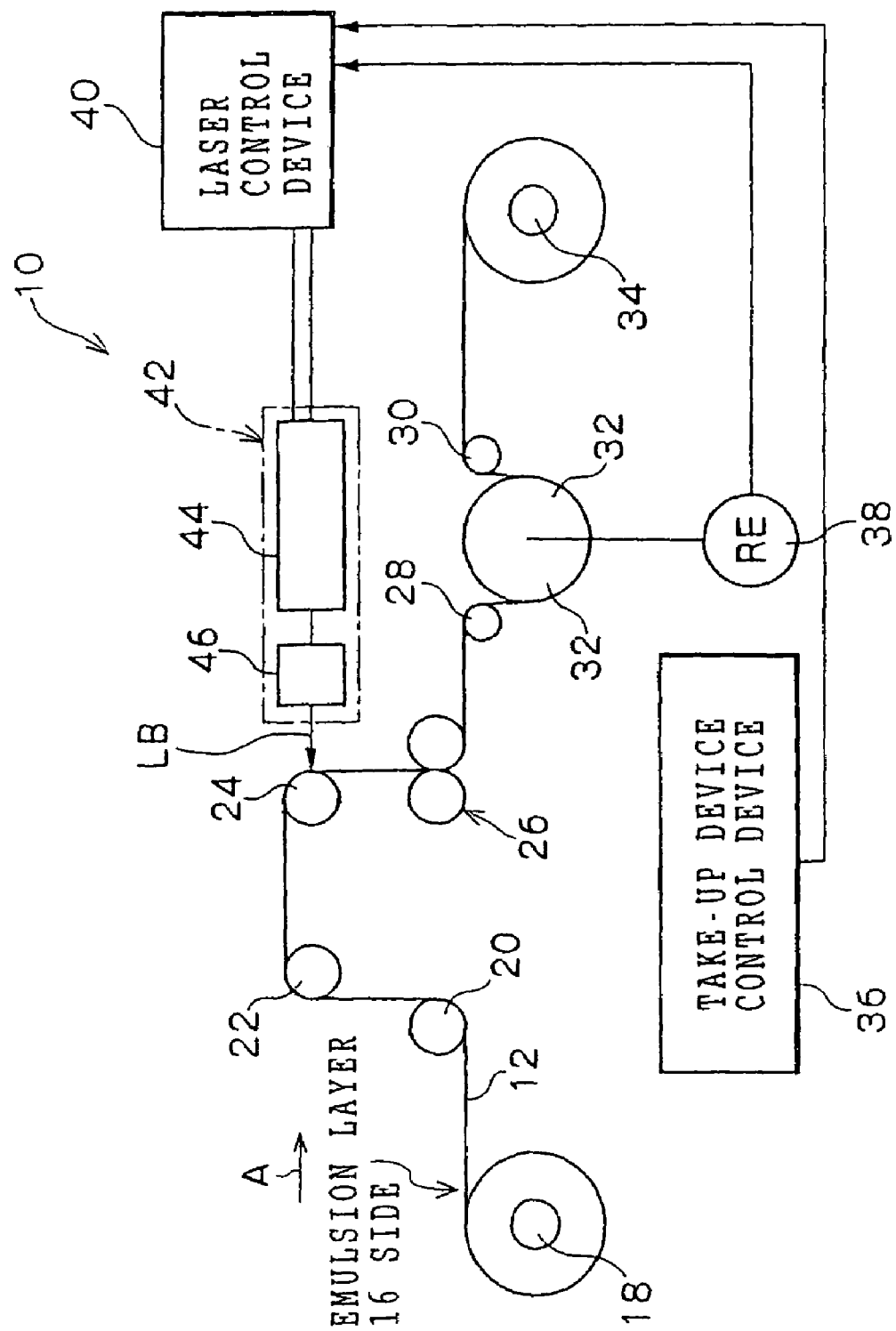
FIG. 1 is a schematic structural view of a marking device applied to an embodiment of the present invention.

A first embodiment of the present invention will be described hereinafter with reference to the drawings. FIG. 1 illustrates the schematic structure of a marking device 10 applied to the present embodiment. In the marking device 10, an elongated X-ray film 12, which is wound-up in the form of a roll, serves as a body to be printed. While the X-ray film 12 is being conveyed, the marking device 10 carries out marking working by illuminating a laser beam LB onto the surface of the X-ray film 12 so as to form a marking pattern of characters, symbols, or the like.

Figure 2:
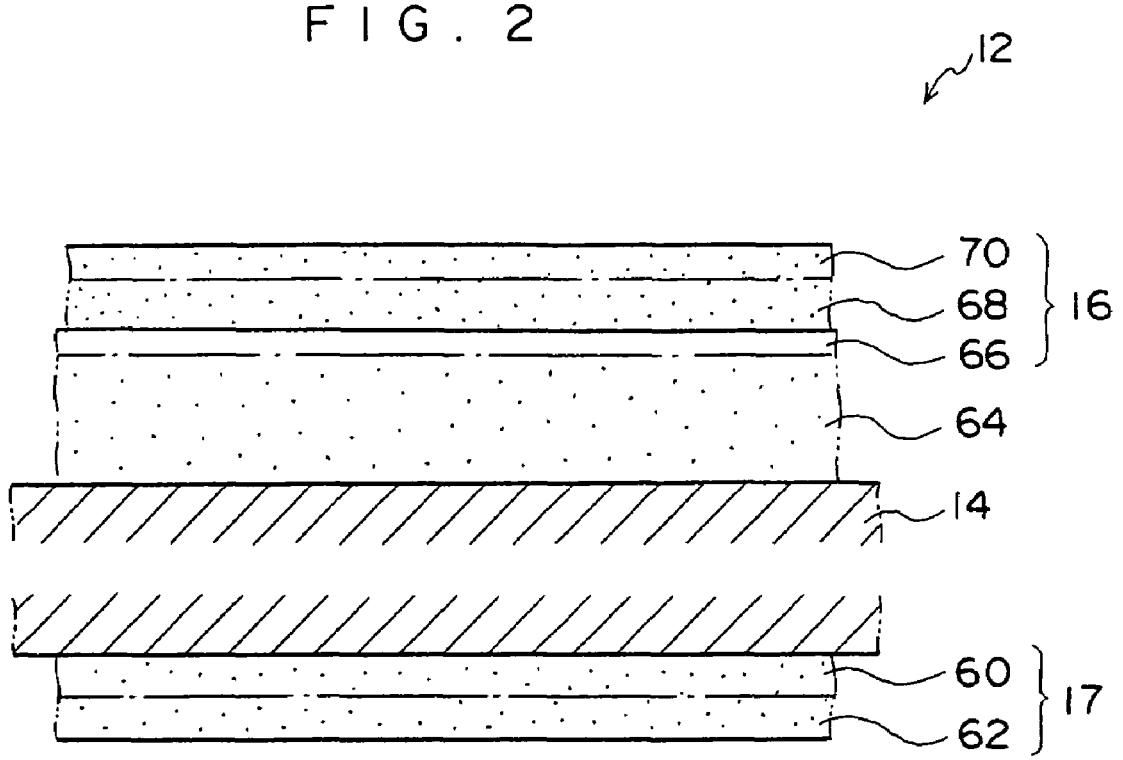
FIG. 2 is a schematic structural view of an X-ray film used as a light-photosensitive heat-developing photosensitive material.

As shown in FIG. 2, in the X-ray film 12, a support formed by using PET (polyethylene terephthalate) or the like is used as a base layer 14. A surface layer 16 is formed on one surface of the base layer 14. A reverse surface layer 17 is formed on the other surface. Note that, in the present embodiment, a case of a so-called single-sided photosensitive material, in which the surface layer 16 is formed at one surface of the base layer 14, will be described as an example. However, the present invention is also applicable to double-sided photosensitive materials in which the surface layers 16 are formed on both surfaces of the base layer 14.

The reverse surface layer 17 is structured by a BC layer 60, whose main material is a decolorable dye and in which gelatin is used as a binder, and a BPC layer 62, whose main material is a base generating agent and in which gelatin is used as a binder.

The X-ray film 12 is a light-photosensitive heat-developing photosensitive material called a dry film. The surface layer 16 is formed by an emulsion layer (Em layer) 64, an MC layer 66, a PC layer 68 and an OC layer 70. The Em layer 64 contains, as the main material thereof, silver bromide (AgBr), silver behenate, phthalazine, a reducing agent, a polyhalogen, or the like, and SBR— latex (styrene butadiene rubber—latex) is used as the binder. The MC layer 66 uses PVA (polyvinyl alcohol) as the binder.

The PC layer 68 and the OC layer 70 use phthalic acid as the main material thereof, and gelatin is used as the binder thereof. Note that gelatin is included as the binder in the Em layer 64 and the MC layer 66 as well.

At the X-ray film 12 which is formed in this way, the Em layer 64 is photosensitized in accordance with an exposed image such that a latent image is formed, and by carrying out heating and pressurizing processings, an image corresponding to the exposed image is made visible. Namely, heat developing is carried out without using processing liquids such as a developing liquid or the like.

As shown in FIG. 1, the X-ray film 12 is wound in the form of a roll on a core 18 with the surface layer 16 facing outwardly. The marking device 10 pulls the X-ray film 12 out from the outermost layer thereof.

The X-ray film 12, which has been pulled-out from the outermost layer, is trained around a path roller 20 such that the direction thereof is switched by substantially a right angle from the advancing direction (the direction of arrow A in FIG. 1) to upward (toward the top of FIG. 1), and the X-ray film 12 is then trained around a path roller 22. The X-ray film 12 is trained around the path roller 22 such that the direction thereof is switched by substantially a right angle to the advancing direction, and the X-ray film 12 reaches a print roller 24.

At the marking device 10, the position at which the X-ray film 12 is trained around the print roller 24 is set as the illumination position of the laser beam LB. The X-ray film 12, whose direction has been switched by substantially a right angle from the advancing direction to downward by the print roller 24, is nipped between a pair of rollers 26 and the direction thereof is switched by substantially a right angle to the advancing direction. The X-ray film 12 is then fed out toward small rollers 28, 30.

A suction drum 32 is disposed between the small rollers 28, 30. A substantially U-shaped conveying path is formed between the small rollers 28, 30 by the suction drum 32. The X-ray film 12 is trained around the suction drum 32 between the small rollers 28, 30.

A plurality of small holes (not illustrated) are provided in the outer peripheral surface of the suction drum 32. By the suction of air, the suction drum 32 sucks and holds the X-ray film 12 which is trained around the peripheral surface of the suction drum 32. The suction drum 32 can move toward the bottom in FIG. 1 due to its own weight or the urging force of an unillustrated urging means.

In this way, because back tension is applied to the X-ray film 12, when the X-ray film 12 is passing by the print roller 24, the state in which the X-ray film 12 is fit extremely tightly to the print roller 24 can be maintained.

The X-ray film 12 which is fed out from the rollers 26 is conveyed in a substantial U shape between the pair of small rollers 28, 30, and is fed-out from the small roller 30. The X-ray film 12, which has passed by the small roller 30, is trained around a core 34.

A take-up control device 36 is provided at the marking device 10. The cores 18, 34 and the suction drum 32 are driven to rotate by the driving force of a driving means (not illustrated) such as a motor or the like which rotates at a predetermined rotational speed by a drive signal from the take-up control device 36, and convey the X-ray film 12.

At the marking device 10, basically, the cores 18, 34 are driven to rotate so as to convey the X-ray film 12 at the same linear speed, and the suction drum 32 rotates while sucking and holding the X-ray film 12. Thus, the rotational speed of the suction drum 32 coincides with the conveying speed (linear speed) of the X-ray film 12 at the print roller 24.

A rotary encoder 38 is attached to the suction drum 32. The rotary encoder 38 outputs a pulse signal corresponding to the angle of rotation of the suction drum 32. At the marking device 10, monitoring of the conveying speed and the conveyed length of the X-ray film 12 is possible from the pulse signal outputted from the rotary encoder 38.

A marking head 42, which emits the laser beam LB, and a laser control device 40, which controls the emission of the laser beam LB, are provided at the marking device 10 as a marker. The rotary encoder 38 is connected to the laser control device 40. A pulse signal corresponding to the conveying of the X-ray film 12 is inputted to the laser control device 40.

Figure 3:
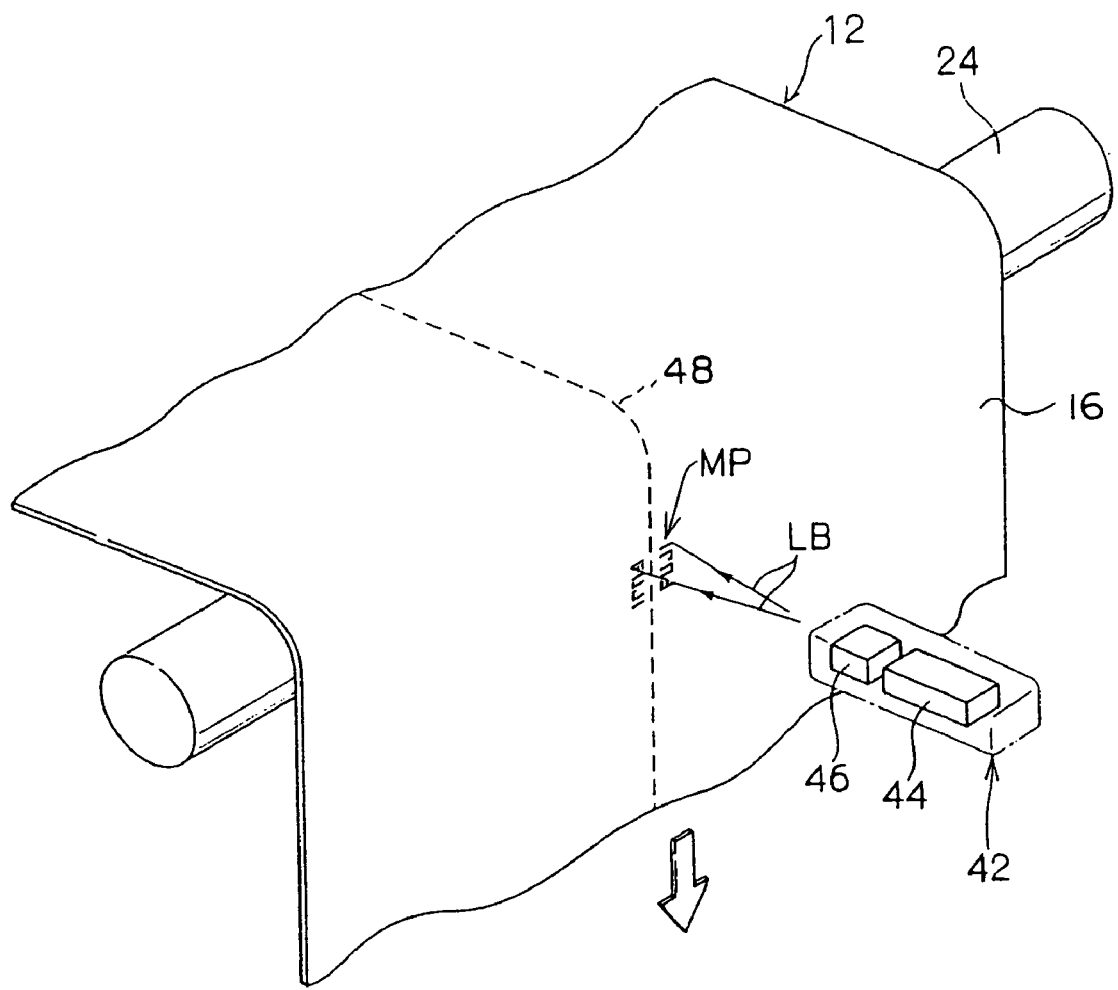
FIG. 3 is a schematic perspective view of main portions of a vicinity of a print roller, showing illumination of a laser beam onto the X-ray film.

As shown in FIGS. 1 and 3, the marking head 42 is disposed such that the laser beam LB emission opening thereof, which is the distal end portion of the marking head 42, opposes the X-ray film 12 which is trained on the print roller 24. The marking head 42 has a laser oscillator 44, and a beam deflector 46 which includes an unillustrated collective lens. The marking head 42 emits the laser beam LB, which is emitted from the laser oscillator 44, toward the X-ray film 12 trained on the print roller 24.

The laser oscillator 44 applied to the present embodiment emits the laser beam LB of a constant oscillation wavelength at a predetermined timing for a predetermined time width (pulse width), on the basis of the drive signal from the laser control device 40 (which is not illustrated in FIG. 3). Namely, due to a drive signal being inputted to the marking head 42, the marking head 42 starts emitting the laser beam LB. When a predetermined period of time has passed, the marking head 42 stops emitting the laser beam LB.

The beam deflector 46 has, for example, an AOD (acousto-optic device), and functions to scan the laser beam LB in a direction orthogonal to the conveying direction of the X-ray film 12, in accordance with a deflection signal from the laser control device 40. Note that the respective scanned laser beams LB are focused by the collective lens so as to connect focal points of predetermined spot diameters on the X-ray film 12.

A pattern signal, which corresponds to the marking pattern (characters and/or symbols) which is to be recorded on the X-ray film 12, is inputted to the laser control device 40 from the take-up control device 36. Further, while the laser control device 40 monitors the conveyed length of the X-ray film 12 on the basis of the pulse signal outputted from the rotary encoder 38 in accordance with the conveying of the X-ray film 12, the laser control device 40 outputs a drive signal to the laser oscillator (a $CO_2$ laser) 44 in accordance with the pattern signal, and outputs a deflection signal to the beam deflector 46.

In this way, the marking head 42 scans the laser beam LB on the X-ray film 12 while turning the laser beam LB on and off in accordance with a marking pattern MP.

At this time, as shown in FIG. 3, at the marking head 42, the scanning direction of the laser beam LB by the beam deflector 46 is the main scanning direction, and the conveying direction of the X-ray film 12 (the direction of the arrow in FIG. 3) is the subscanning direction. Due to the marking head 42 illuminating the laser beam LB on the X-ray film 12 while scanning the laser beam LB, the marking pattern MP (which, here, is letters of the alphabet) is formed on the X-ray film 12.

Figures 4A, 4B:
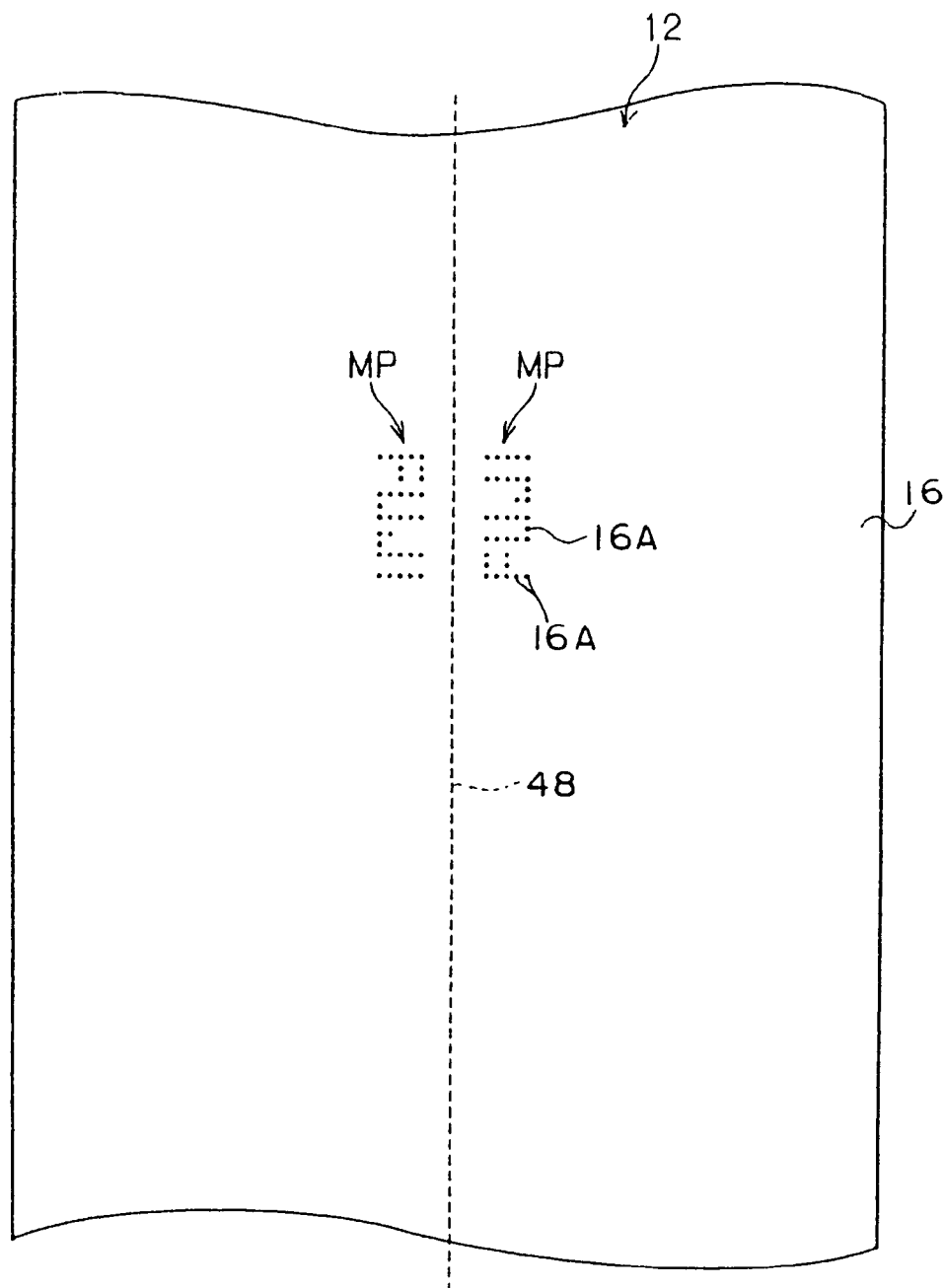
FIG. 4A is a schematic plan view showing an example of an X-ray film on which a marking pattern is formed.
FIG. 4B is a schematic diagram showing an example of a character array used as a marking pattern.

As shown in FIGS. 3, 4A and 4B, the marking pattern MP can be formed by using characters, symbols, or the like which are formed from predetermined dot arrangements in which, for example, one character is 5×5 dots or the like. Further, as shown in FIG. 4B for example, the marking pattern MP can be formed by an arbitrary structure, such as by using a plurality of characters, numbers, symbols or the like formed by dot arrangements.

Note that, as shown in FIGS. 3 and 4A, when the X-ray film 12 is cut in the longitudinal direction thereof (a cut line 48 is shown by the dashed line) and worked into the form of rolls or the form of sheets having narrow widths, the marking patterns MP, which are oriented upside-down with respect to one another, can be formed on both sides of this cut line 48.

In order to form the marking pattern MP, which is expressed by such dot arrangements, at a high quality, the diameters of the individual dots must be made to be substantially constant (e.g., 100 μm), and the laser beam LB must be illuminated in a state in which the conveying speed of the X-ray film 12 is maintained substantially constant.

Here, as shown in FIGS. 1 through 3, at the marking device 10, the marking head 42 opposes the X-ray film 12 at a position at which the X-ray film 12 floats up slightly from the peripheral surface of the print roller 24 when the X-ray film 12 is trained around the print roller 24. In this way, it is possible to prevent the laser beam LB which passes through the X-ray film 12 from heating dirt, dust or the like adhering to the peripheral surface of the print roller 24, and to prevent fog from occurring at the X-ray film 12.

Note that, at this time, due to a constant tension being applied to the X-ray film 12 by the suction drum 32 and the like, it is possible to reliably prevent the distance from the X-ray film 12 to the marking head 42 from varying.

Figure 5A:
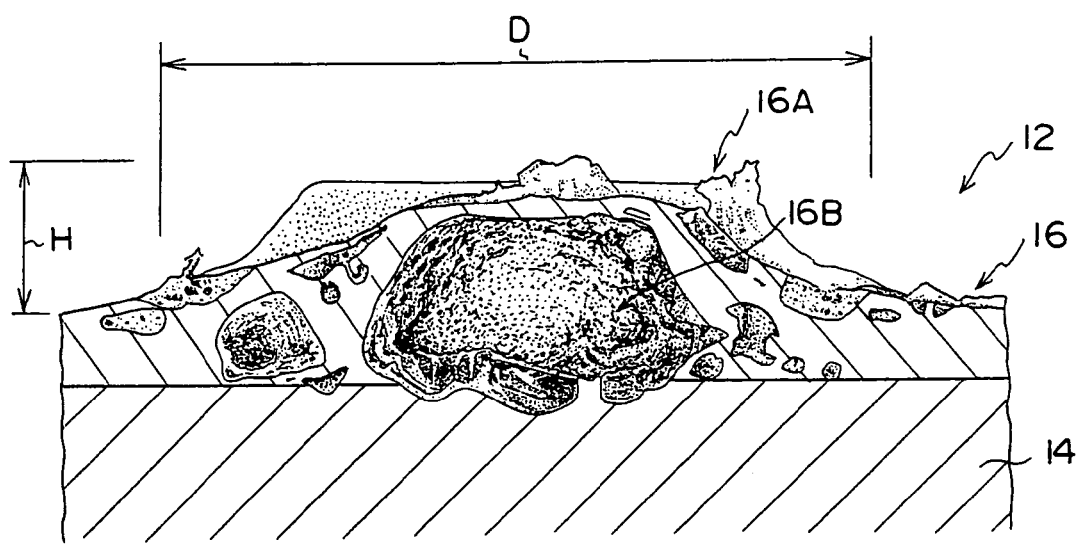
FIG. 5A is a schematic sectional view (a view as observed under a microscope) of a vicinity of a dot formed by illuminating a laser beam onto a surface layer, and shows a state in which a cavity has been formed at the surface layer.

As shown in FIG. 5A, due to the laser beam LB being illuminated onto the surface layer 16 of the X-ray film 12, a dot 16A is formed in a shape which is convex with respect to the surface layer 16. At this time, at the X-ray film 12, in the process of melting by the heat received from the laser beam LB, a cavity 16B arises within the surface layer 16. Note that, at the marking head 42, the focal point position of the laser beam LB is set so that melting occurs at the interior of the surface layer 16.

At the X-ray film 12, due to the cavity 16B being formed within the surface layer 16, irregular reflection of light arises at the boundary film of the cavity 16B (the inner wall surface of the cavity 16B), and visual recognition as the dot 16A is possible.

At this time, when a projecting height H of the dot 16A with respect to the top surface of the surface layer 16 is 10 $\mu$m or more and an outer diameter D of the dot 16A is about 100 $\mu$m, high visibility is achieved.

Namely, at the light-photosensitive heat-developing photosensitive material, the transmittance of the surface layer 16 is high. However, due to the cavity 16B arising in the surface layer 16, irregular reflection of light arises at the boundary film of the periphery of the cavity 16B, and visual recognition as the dot 16A is therefore possible. At this time, due to the projecting height H of the dot 16A being 10 $\mu$m or more and the size (outer diameter D) of the dot 16A exceeding 100 $\mu$m, high visibility is achieved.

The X-ray film 12 is subjected to developing processing by being heated, without the use of processing liquids such as a developing liquid or the like. Thus, even if the cavities 16B arise at the interior of the surface layer 16, at the time of developing processing, the surface layer 16 does not peel off from the base layer 14 due to the cavities 16B. Therefore, with the dot 16A, high visibility is achieved not only in the state in which the X-ray film 12 has not yet been developed, but also in the state in which the X-ray film 12 has been developed.

Figure 5B:
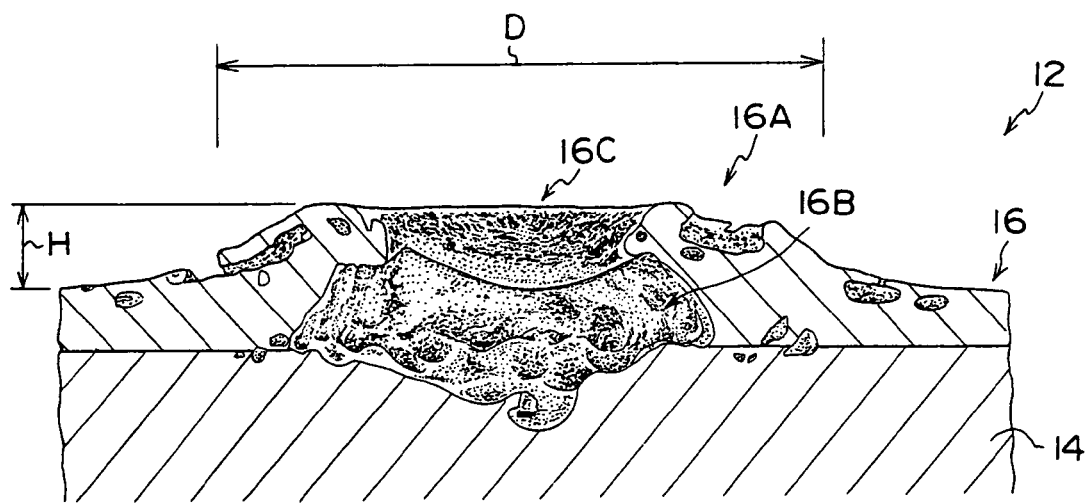
FIG. 5B is a schematic sectional view (a view as observed under a microscope) of a vicinity of a dot formed by illuminating a laser beam onto the surface layer, and shows a state in which an opening portion, which exposes the base layer, is formed due to the melting of the surface layer progressing from FIG. 5A.

As shown in FIG. 5B, at the X-ray film 12, when the time over which the laser beam LB is illuminated becomes long and the amount of heat received from the laser beam LB becomes greater than needed, the melting of the surface layer 16 proceeds and an opening portion 16C is formed at the top surface side of the cavity 16B such that the base layer 14 is exposed.

Namely, when the melting of the surface layer 16 proceeds and the cavity 16B swells, the projecting height H of the dot 16A also becomes larger. However, due to the melting of the surface layer 16 proceeding further, the surface layer 16 at the top portion of the cavity 16B melts such that the opening portion 16C arises. Moreover, due to the melting of the surface layer 16 proceeding even further, the periphery of the opening portion 16C melts such that the substantial projecting height H of the dot 16A conversely becomes lower.

If the opening portion 16C is small, irregular reflection of light arises due to the boundary film at the periphery, and therefore, visibility of the dot 16A is achieved. However, when the opening portion 16C becomes large, because the transmittance of the surface layer 16 is high, visual perception as the dot 16A is difficult.

Namely, when the base layer 14 is exposed by the opening portion 16C, it is difficult to differentiate between the base layer 14 exposed by the opening portion 16C, and the surface layer 16 at the periphery of the opening portion 16C. Therefore, visual perception as the dot 16A formed by the illumination of the laser beam LB is difficult.

In the X-ray film 12, due to the illumination time becoming longer, the heat which the surface layer 16 receives from the laser beam LB increases. Further, when the wavelength of the laser beam LB is in the band of 9 $\mu$m such as 9.2 $\mu$m, 9.6 $\mu$m, 9.8 $\mu$m, the amount of heat applied to the surface layer 16 of the X-ray film 12 is great as compared with a case in which the wavelength of the laser beam LB is in the 10 $\mu$m band such as 10.2 $\mu$m or the like.

Namely, the configuration and the visibility of the dot 16A formed at the surface layer 16 of the X-ray film 12 vary in accordance with the wavelength and the illumination time of the laser beam LB.

At the marking device 10, by controlling the illumination time of the laser beam LB appropriately in accordance with the oscillation wavelength of the laser oscillator 44, the projecting height H of the dot 16A is made to be 10 $\mu$m or more and kept to be 50 $\mu$m or less. In this way, proper cavities 16B are formed within the surface layer 16 of the X-ray film 12, and the marking pattern MP formed by the dots 16A or an arrangement of the dots 16A having high visibility is formed.

In the marking device 10 which is structured in this way, the pulling-out of the X-ray film 12 wound on the core 18 is started, and the conveying of the X-ray film 12 and the taking-up of the X-ray film 12 onto the core 34 are started, in accordance with the drive signal outputted from the take-up control device 36.

Due to the suction drum 32 being controlled by the take-up control device 36 so as to start up the suction of air while rotating, the suction drum 32 sucks and holds the X-ray film 12 which is trained around the peripheral surface thereof. In this way, the X-ray film 12 is fed-out while being pulled-in between the small rollers 28, 30, at a predetermined linear speed. At this time, the suction drum 32 applies a predetermined tension to the X-ray film 12 due to the weight of the suction drum 32 or the urging force of an urging means.

In this way, the rotational speed (peripheral speed) of the suction drum 32 is the linear speed which is the reference for the conveying system of the X-ray film 12. The linear speed of the X-ray film 12 on the print roller 24 coincides with the peripheral speed of the suction drum 32.

The laser control device 40 detects the rotational state of the suction drum 32 by the rotary encoder 38.

When a pattern signal corresponding to the marking pattern MP which is to be recorded on the X-ray film 12 is inputted to the laser control device 40 from the take-up control device 36, the laser control device 40 monitors the conveyed length of the X-ray film 12 on the basis of the pulse signal outputted from the rotary encoder 38. For example, when the conveyed length of the X-ray film 12 reaches a length which is set in advance, the laser control device 40 outputs a drive signal to the laser oscillator (the $CO_2$ laser) 44 and outputs a deflection signal to the beam deflector 46, on the basis of the pattern signal.

In this way, the laser beam LB which is emitted from the laser oscillator 44 is illuminated while being scanned on the X-ray film 12 which is trained on the print roller 24. The marking pattern MP, which is in the form of dots and corresponds to the pattern signal, is formed on the X-ray film 12.

Due to the laser beam LB being illuminated on the X-ray film 12, the surface layer 16 is melted. In this process of melting of the surface layer 16, the cavity 16B is formed at the interior of the surface layer 16, and the surface layer 16 becomes convex, and the dot 16A is thereby formed. Namely, due to the laser beam LB being illuminated, the dome-shaped dot 16A is formed at the surface layer 16 of the X-ray film 12.

At this time, the illumination time of the laser beam LB emitted from the marking head 42 toward the surface of the X-ray film 12 is appropriately controlled, in accordance with the wavelength of the laser beam LB (the oscillation wavelength of the laser oscillator 44) and the output of the laser oscillator 44, to be an illumination time from the start of the illumination of the laser beam LB until the end of illumination. In this way, the projecting height H of the dot 16A is 10 μm or more and preferably 50 μm or less, and while the top portion of the dot 16A melts without a large opening portion 16C arising, an appropriate cavity 16B is formed at the interior of the surface layer 16.

In this way, the dot 16A can be formed while preventing the formation of a large opening portion 16C at the top portion of the dot 16A and preventing the base layer 14 from being greatly exposed.

Due to the cavity 16B being formed at the interior of the dot 16A which is formed in this way, irregular reflection of light occurs. The dot 16A having high visibility is thereby formed at the X-ray film 12, regardless of the densities of the base layer 14 and the surface layer 16 and regardless of the transmittance of the surface layer 16.

EXPERIMENTAL EXAMPLES

Shown here are experimental results of evaluating the visibility of the dot 16A at the time when energy required for forming a proper dot was applied by controlling the illumination time of the laser beam LB by using laser oscillators of different outputs.

Figure 6:
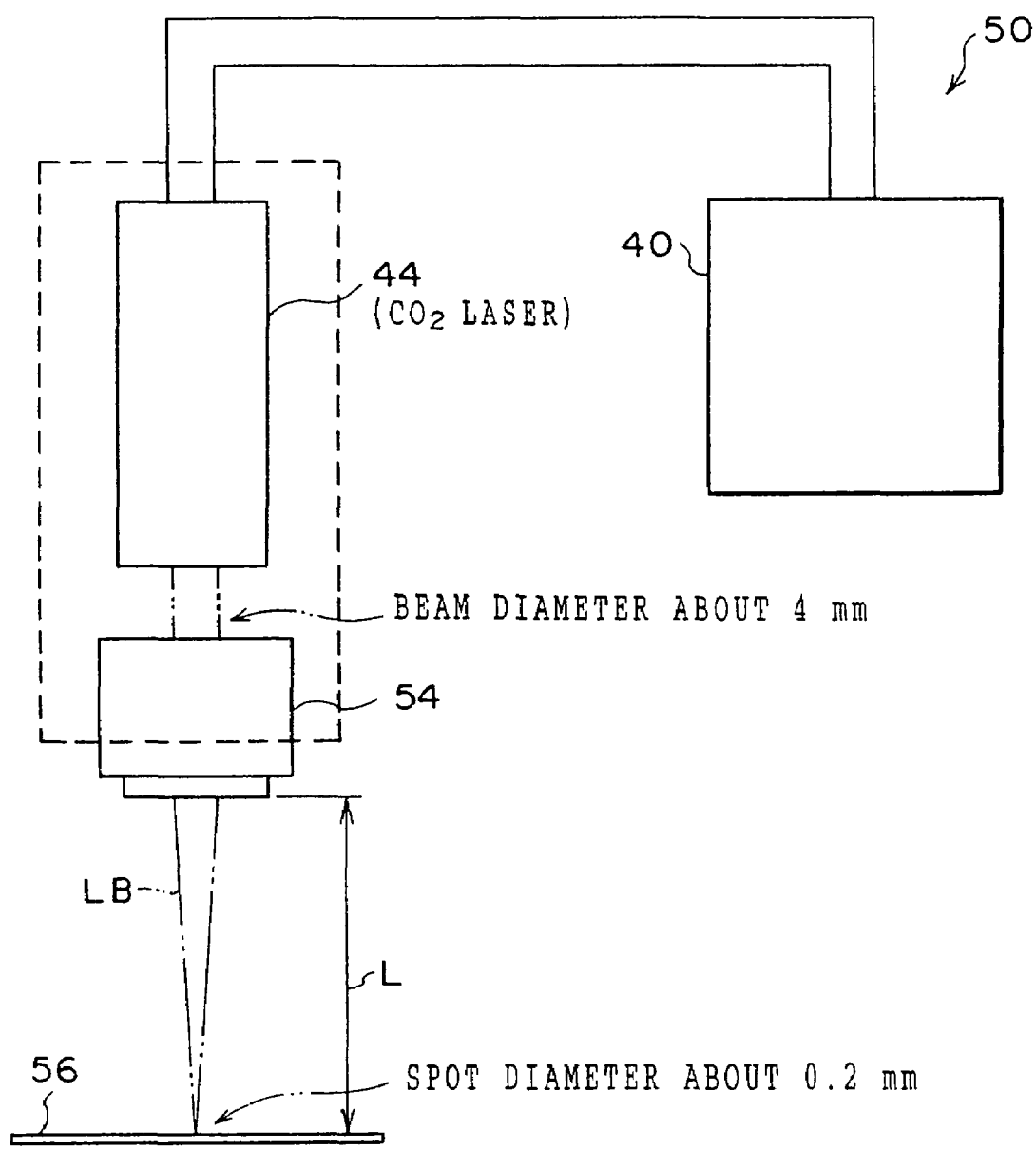
FIG. 6 is a schematic structural view of a testing device used in an experiment for evaluating the visibility of dots.

FIG. 6 shows the basic structure of a testing device 50 which carries out marking by using the laser oscillator 44 which oscillates a $CO_2$ laser.

In this experiment, because it is not necessary to scan the laser beam LB, at the testing device 50, a collective lens 54 is disposed at the emitting end of the laser oscillator 44 which is driven by the laser control device 40. The laser beam LB is illuminated toward a sample 56 of the X-ray film 12. Note that, in the testing device 50, the beam diameter of the laser beam LB emitted from the laser oscillator 44 is about 4 mm. The collective lens 54 collects the laser beam LB such that the laser beam LB is illuminated in the form of a spot having a spot diameter of about 0.2 mm, on the sample 56 which is disposed apart at a distance L of 80 mm.

Further, for the wavelength of the laser beam LB which is used in evaluating the visibility, a band of 9 μm from 9.2 μm to 9.8 μm, and a band of 10 μm from 10.2 μm to 10.8 μm are used. Namely, as the laser oscillator 44, a laser oscillator having an oscillation wavelength in the 9 μm band (e.g., 9.6 μm) and a laser oscillator having an oscillation wavelength in the 10 μm band (e.g., 10.6 μm) are used.

Further, as the laser oscillators 44 of each of these oscillation wavelengths, the laser oscillator 44 having an output of 50 W and the laser oscillator 44 having an output of 100 W are used. The visibility of the dot 16A formed on the sample 56 is evaluated at the time of changing the illumination time of the laser beam LB, at each of the oscillation wavelengths and each of the outputs.

The experimental results of the visibility evaluation experiment are shown in FIGS. 7 and 8. The symbols expressing the evaluation of the visibility have the following meanings.

⊚ . . . a dot in which an appropriate cavity is formed within the surface layer, and which has extremely good visibility ○ . . . a dot in which a cavity is formed in the surface layer, and which has visibility which is good to the extent that the existence of the dot can be recognized at a glance Δ . . . a dot in which a portion of the base layer (substrate) is exposed, but which can be perceived visually X . . . a dot in which either no cavity substantially arises within the surface layer, or the base layer is completely exposed, and whose existence cannot be recognized at a glance, and whose visibility is markedly poor Further, the evaluation of the visibility is carried out after the sample 56 on which the dot 16A is formed has been subjected to heat developing processing.

As shown in FIG. 7, in the case of using the laser oscillator 44 whose oscillation output is 100 W and whose oscillation wavelength is in the 9 μm band, with the laser beam LB illumination time being in a range of 25 μsec to 35 μsec, the dot 16A having high quality and extremely high visibility can be formed.

Further, when the laser beam LB illumination time is in a range of 20 μsec to 25 μsec, which is shorter than the previous case, the dot 16A whose projecting height H is low but which has good visibility can be obtained. However, when the laser beam LB illumination time is shortened even more (20 μsec or less), no cavity is formed in the surface layer 16, nor does deformation arise at the surface of the surface layer 16.

Moreover, when the laser beam LB illumination time is in the range of 35 μsec to 50 μsec, melting occurs to the surface layer 16 at the top portion of the dot 16A, and the base layer 14 is exposed. Thus, the visibility of the dot 16A deteriorates. When the laser beam LB illuminating time exceeds 50 μsec, the surface layer 16 at the periphery of the opening portion 16C is completely melted, and the dot 16A disappears and cannot be visually perceived.

In the case of using the laser oscillator 44 whose oscillation output is 100 W and whose oscillation wavelength is in the 10 μm band, with the laser beam LB illumination time being in the range of 40 μsec to 50 μsec, the dot 16A whose projecting height H is low but which has good visibility is obtained. However, when the laser beam LB illumination time is 40 μsec or less which is shorter, no cavity arises in the surface layer 16 and no deformation of the surface layer 16 occurs.

Moreover, when the laser beam LB illumination time is in the range of 50 μsec to 80 μsec, the top portion of the dot 16A melts and the base layer 14 is exposed. Therefore, the visibility of the dot 16A deteriorates. When the laser beam LB illumination time exceeds 80 μsec, the surface layer 16 at the periphery of the opening portion 16C completely melts, and the dot 16A disappears and cannot be visually perceived.

In contrast, as shown in FIG. 8, when the oscillation output is lowered to 50 W, with the laser beam LB in the 9 μm band, when the laser beam LB illumination time is in the range of 55 μsec to 60 μsec, the dot 16A can be visually perceived. However, when the laser beam LB illumination time is 55 μsec or less, either there is slight deformation of the surface layer 16 (when the laser beam LB illumination time is in the range of 50 μsec to 55 μsec) or deformation of the surface layer 16 does not occur (when the laser beam LB illumination time is 50 μsec or less), and it is difficult to visually perceive the dot 16A. Moreover, when the laser beam LB illumination time exceeds 60 μsec, the base layer 14 is greatly exposed, and visual recognition of the dot 16A is difficult.

In addition, with the laser beam LB whose oscillation output is 50 W and whose oscillation wavelength is in the 10 μm band, when the laser beam LB illumination time is in the range of 90 μsec to 100 μsec, visual perception of the dot 16A is possible. However, with the laser beam LB illumination time being 90 μsec or less, either there is slight deformation of the surface layer 16 (when the laser beam LB illumination time is in the range of 80 μsec to 90 μsec) or deformation of the surface layer 16 does not occur (when the laser beam LB illumination time is 80 μsec or less), and it is difficult to visually perceive the dot 16A. Moreover, when the laser beam LB illumination time exceeds 100 μsec, the base layer 14 is greatly exposed, and visual recognition of the dot 16A is difficult.

In this way, the visibility of the dot 16A formed on the X-ray film 12 varies greatly in accordance with the oscillation wavelength and the illumination time of the laser beam LB. From this, the illumination time of the laser beam LB is controlled appropriately, the cavity 16C is formed within the surface layer 16, and the projection height H is made to be 10 μm or more and preferably 50 μm or less. In this way, and the dot 16A, in which exposure of the base layer 14 is suppressed and which has high quality and high visibility, can be formed.

Further, if the projecting height H of the dot 16A is in the aforementioned range, even if the top portion of the dot 16A melts and an opening portion 16C is formed and the base layer 14 is in a state in which a portion thereof is exposed, visual recognition as the dot 16A is possible.

By using the laser oscillator 44 whose oscillation output is high, it is easy to form the dot 16A which has high visibility. Further, when the laser beam LB whose oscillation wavelength is in the 9 μm band is used, it is easier to more efficiently form the dot 16A having high visibility than in a case in which the laser beam LB having an oscillation wavelength in the 10 μm band is used.

Namely, even in cases in which energy which can form an appropriate dot 16A is applied to the sample 56, by making the laser beam LB illumination time long, melting of the surface layer 16 proceeds and the visibility of the dot 16A deteriorates.

From this, not only by controlling the laser beam LB illumination time at the time of forming the dot 16A, but also, by using the laser beam LB in the 9 μm band or the laser oscillator 44 whose oscillation output is high results in more effective formation of the marking pattern MP by the dot 16A having high visibility or by an arrangement of dots having high visibility.

The above-described embodiment is not intended to limit the structure of the present invention. For example, in the present embodiment, the marking device 10 is described as an example. However, the marking method of the present invention is not limited to the same, and can be applied to a marking device of an arbitrary structure provided that the marking device illuminates a laser beam onto the surface layer of a light-photosensitive heat-developing photosensitive material so as to form a marking pattern by a dot or an arrangement of dots.

As described above, in accordance with the present invention, a laser beam is illuminated so as to melt the interior of the surface layer of a light-photosensitive heat-developing photosensitive material, and a cavity is formed at the interior of the surface layer, and the top surface side of the surface layer deforms in a convex form. In this way, even in the case of a light-photosensitive heat-developing photosensitive material whose surface layer has high transmittance, it is possible to achieve the excellent effect that a dot having high visibility can be formed, and a marking pattern, which has high visibility and is formed by the dot or an arrangement of the dots, can be formed.

Hereinafter, another embodiment of the present invention will be described with reference to the figures. The schematic structure of a marking device 110 applied to the present embodiment is shown in FIG. 9.

While the marking device 110 conveys an X-ray film 112 which is wound-up in the form of a roll, the marking device 110 illuminates the laser beam LB onto the surface of the X-ray film 112 so as to form a dot or an arrangement of dots. A marking pattern, which is a character or a symbol, or a character array of plural characters or symbols or the like, or the like is thereby formed on the X-ray film 112.

Figure 10A:
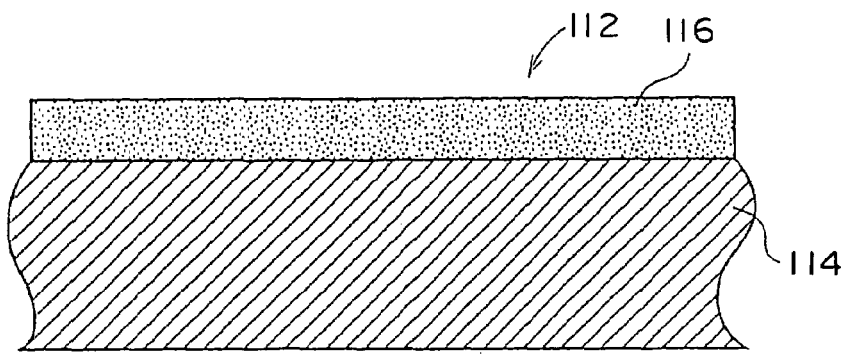
FIG. 10A is a schematic structural view of an X-ray film applied to an embodiment of the present invention.

The X-ray film 112 which is used as the photosensitive material in the present embodiment, is a heat-developing photosensitive material for medical use. As shown in FIG. 10A, the X-ray film 112 has a multi-layer structure including a base layer 114 which is a support using PET (polyethylene terephthalate) for example, and an emulsion layer 116 which is formed on at least one surface of the base layer 114 by coating an emulsion.

Figure 9:
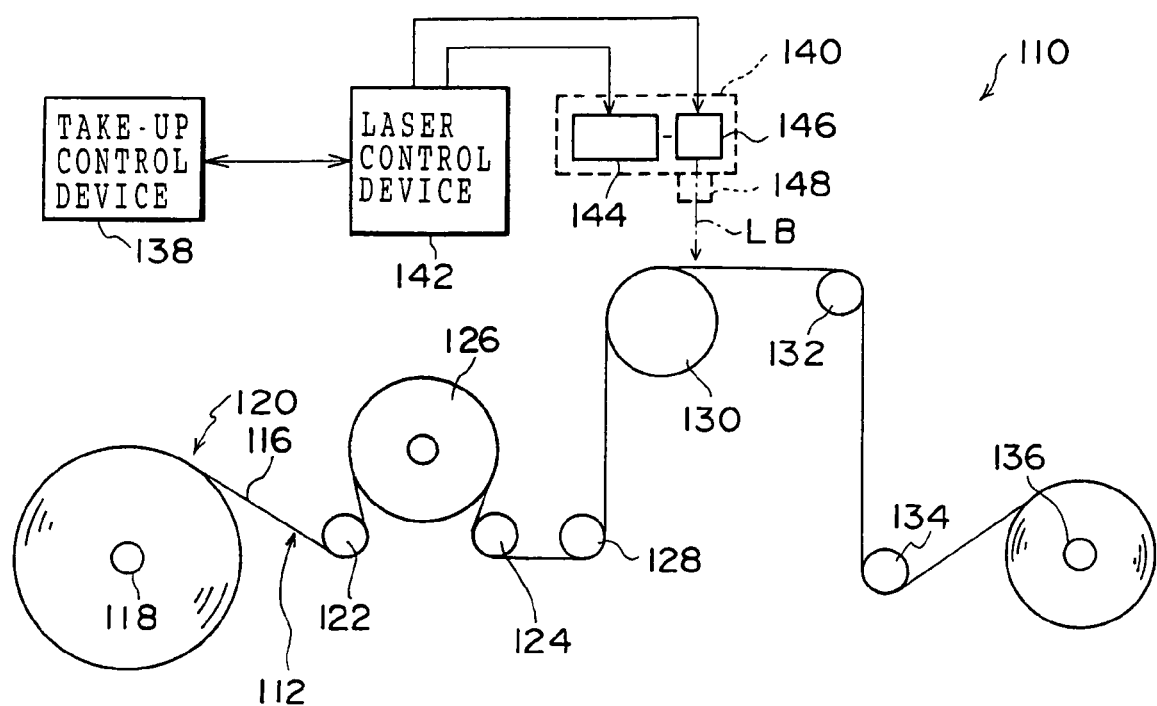
FIG. 9 is a schematic structural view of a marking device applied to an embodiment of the present invention.

As shown in FIG. 9, the X-ray film 112 which is to be processed in the marking device 110 is loaded as a roll 120 which is wound in layers on a core 118 such that, for example, the emulsion surface 116 thereof faces outwardly.

In the marking device 110, a pair of small rollers 122, 124 are disposed in a vicinity of the position where the roll 120 is loaded. The X-ray film 112 which is pulled-out from the roll 120 is first trained on the small roller 122.

A suction drum 126 is provided between the small rollers 122, 124. A substantially U-shaped conveying path is formed by the small rollers 122, 124 and the suction drum 126. The X-ray film 112 is trained around the outer peripheral surface of the suction drum 126 between the small rollers 122, 124 such that the emulsion surface 116 side thereof faces outward.

A plurality of small holes (not illustrated) are formed in the outer peripheral surface of the suction drum 126. The X-ray film 112, which is trained around the outer peripheral surface of the suction drum 126, is sucked and held due to negative pressure being supplied to these small holes. Further, at the marking device 110, as an example, the suction drum 126 can move upwardly in FIG. 10 due to the urging force of an unillustrated urging means. In this way, at the marking device 110, a constant tension is applied to the X-ray film 112.

At the marking device 110, the suction drum 126 is driven to rotate at a predetermined rotation speed by the driving force of an unillustrated driving means.

In this way, the X-ray film 112 is conveyed while being pulled-out from the roll 120 at a linear speed corresponding to the rotational speed of the suction drum 126. Then, the film 112 is fed-out from the small roller 124.

The path roller 128 is provided in a vicinity of the small roller 124. Due to the X-ray film 112 being trained around this path roller 128, the conveying direction is switched to upward.

A print roller 130 is provided above the path roller 128. Due to the X-ray film 112 being trained around the print roller 130, the X-ray film 112 is directed in the horizontal direction. At this time, due to a predetermined tension being applied to the X-ray film 112, the X-ray film 112 is trained tightly around the peripheral surface of the print roller 130 with the emulsion surface 116 side thereof facing outward.

At the marking device 110, a path roller 132 is provided at a horizontal direction side of the print roller 130. A reversing roller 134 is provided beneath the path roller 132.

Due to the X-ray film 112, which is trained around and fed-out from the print roller 130, being trained around the path roller 132, the direction of the X-ray film 112 is changed to downward. Moreover, after being trained around the reversing roller 134, the film 112 is taken-up onto a core 136. At this time, the film 112 is taken-up onto the core 136 such that, for example, the emulsion surface 116 side thereof faces outward in the same way as at the roll 120.

A take-up control device 138 which controls operation is provided at the marking device 110. The take-up control device 138 controls an unillustrated drive source so as to drive the suction drum 126 and the core 136 to rotate.

In this way, after the X-ray film 112, which has been pulled-out from the roll 120, is trained around the print roller 130, the X-ray film 112 reaches the core 136. Then, the film 112 is taken-up in layers onto the core 136.

An unillustrated rotary encoder is provided at the suction drum 126. The rotating shaft of the rotary encoder rotates integrally with the suction drum 126, and the rotary encoder outputs a pulse signal corresponding to the angle of rotation of the suction drum 126. By measuring this pulse signal at the take-up control device 138, detection of the conveying speed and the conveyed length of the X-ray film 112 are possible.

The marking device 110 is provided with a marking head 140, and a laser control device 142 which controls operation of the marking head 140.

The pulse signal, which is from the rotary encoder and corresponds to the rotation of the suction drum 126, is inputted to the laser control device 142. The laser control device 142 controls the operation of the marking head 140 while monitoring the conveying speed and the conveyed length of the X-ray film 112 on the basis of this pulse signal.

Figure 11:
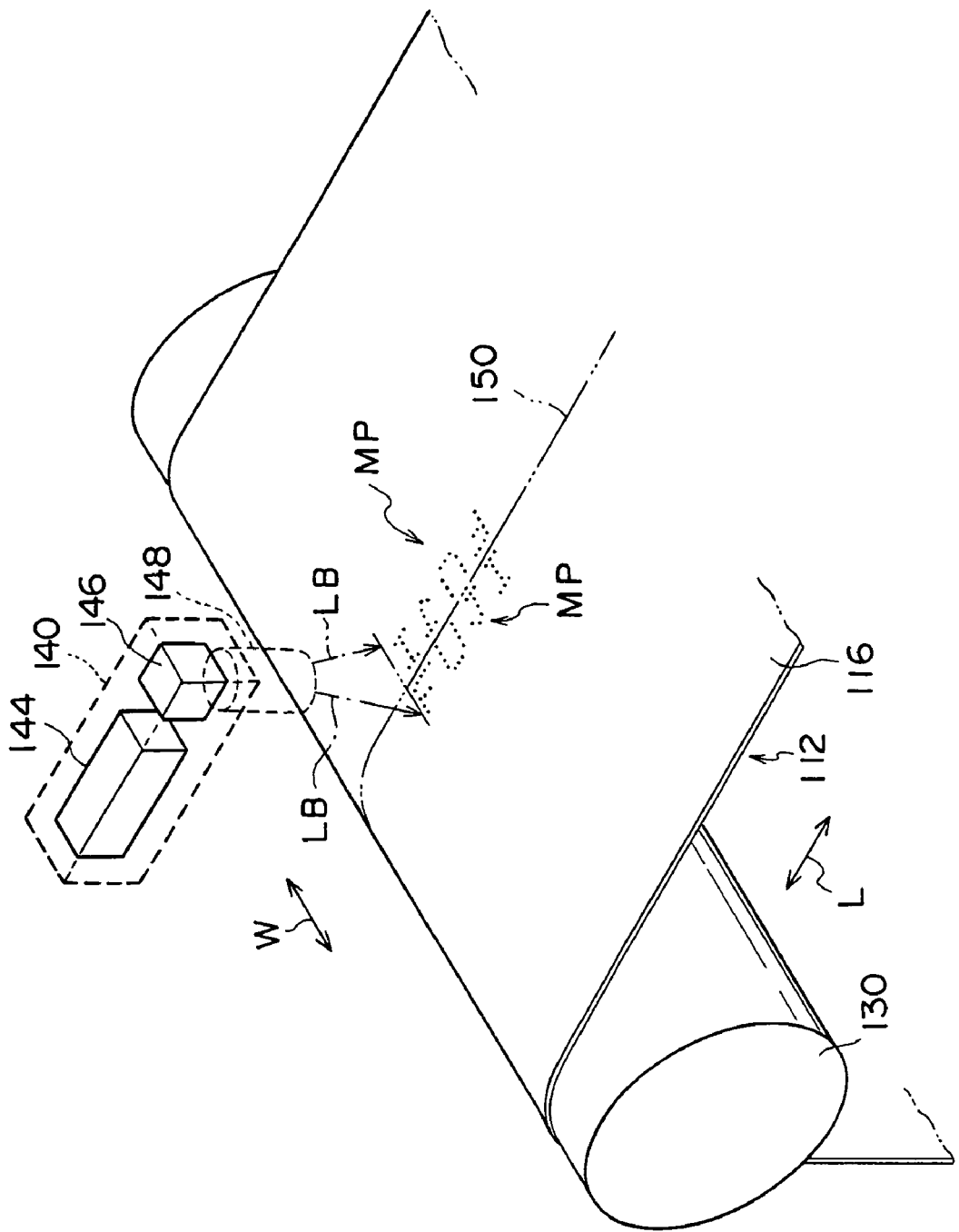
FIG. 11 is a schematic perspective view of main portions in a vicinity of a print roller and a marking head.

As shown in FIGS. 9 and 11, a laser oscillating tube 144, which is provided as a laser oscillator, and a beam deflector 146, which is provided as a beam deflector, are disposed within the marking head 140. Further, the marking head 140 is provided with a lens barrel 148 equipped with an unillustrated collective lens or the like.

The laser oscillating tube 144 applied to the present embodiment is a $CO_2$ laser. The oscillating tube 144 emits the laser beam LB of a constant oscillation wavelength on the basis of a drive signal from the laser control device 142.

The beam deflector 146 is provided with, for example, an AOD (acousto-optic device). On the basis of a deflection signal inputted from the laser control device 142, the beam deflector 146 emits the laser beam LB, which is emitted from the laser oscillating tube 144, toward the X-ray film 112 trained on the print roller 130, while deflecting the laser beam LB along the transverse direction of the X-ray film 112.

The laser beam LB is collected by passing through the lens barrel 148. Then, the beam LB is illuminated so as to be a predetermined spot diameter on the X-ray film 112.

At the X-ray film 112, a large number of minute air bubbles are generated in the process in which melting and transpiration arise at the emulsion layer 116 due to the illumination of the laser beam LB. At the X-ray film 112, due to the large number of air bubbles being generated, irregular reflection of light occurs at the boundary films between the air bubbles, and a perceivable dot is formed regardless of whether the X-ray film 112 has been developed or has not been developed, and regardless of the level of the density.

At the marking device 110, characters or symbols are formed by arrangements of these dots. In addition, an array of characters, in which these characters or symbols are lined up at predetermined intervals, is formed on the X-ray film 112 as the marking pattern MP.

The laser control device 142 outputs a drive signal to the laser oscillating tube 144. In the state in which the laser oscillating tube 144 is being driven, a pattern signal, which corresponds to the marking pattern MP which is to be formed on the X-ray film 112, is inputted from, for example, the take-up control device 138. The control device 142 outputs a deflection signal to the beam deflector 146 in accordance with this pattern signal.

In this way, the laser beam LB is scanned, in accordance with the marking pattern MP to be formed, on the X-ray film 112 which is trained around the print roller 130.

At this time, the laser control device 142 monitors the conveyed length of the X-ray film 112 on the basis of the pulse signal outputted from the rotary encoder provided at the suction drum 126. Each time the conveyed length reaches a predetermined length, the control device 142 outputs the deflection signal to the beam deflector 146.

Figure 10B:
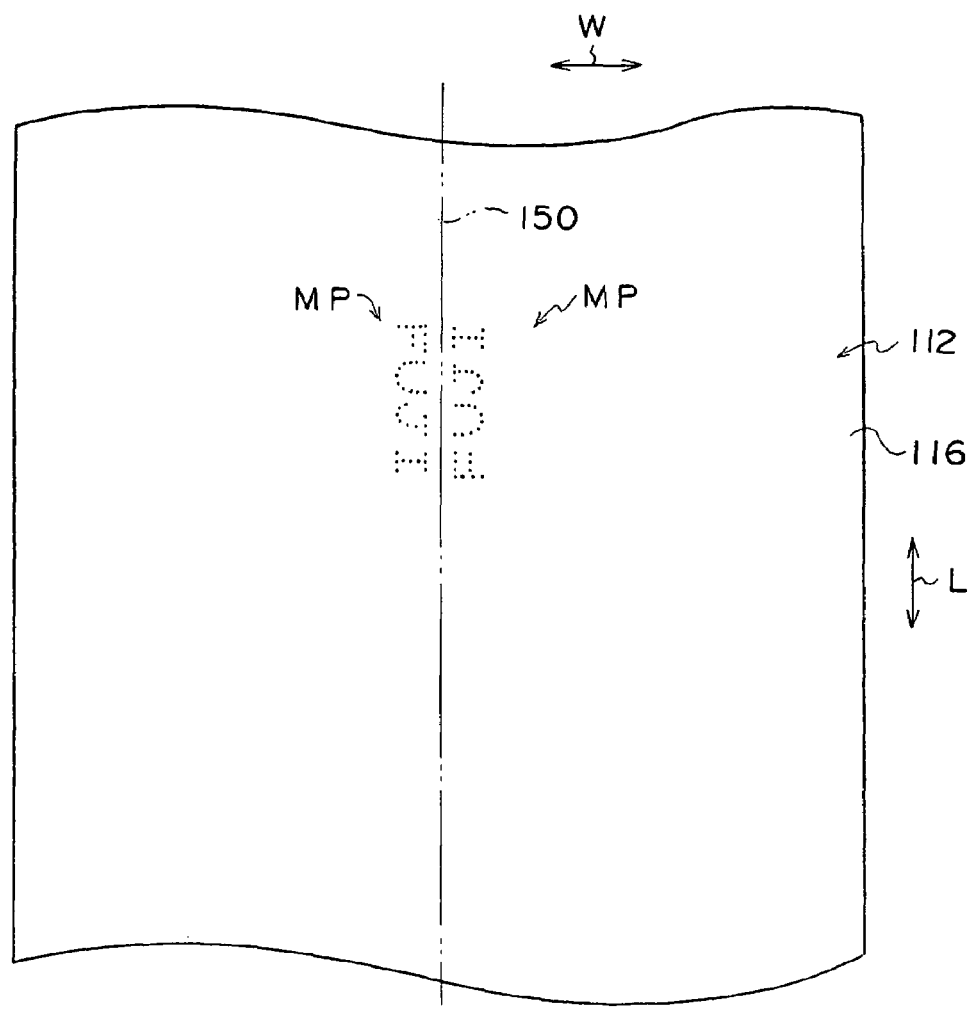
FIG. 10B is a schematic diagram of an X-ray film at which a marking pattern is formed.

In this way, at the marking device 110, the marking pattern is formed on the X-ray film 112 at predetermined intervals. Namely, at the marking device 110, as shown in FIG. 10B, by illuminating the laser beam LB with the conveying direction of the X-ray film 112 (the direction of arrow L in FIG. 10B) being the subscanning direction and the scanning direction of the laser beam LB being the main scanning direction, the marking pattern MP in the form of dots is formed. Note that FIG. 10B illustrates, as an example, the marking pattern MP which is formed by letters of the alphabet in dot arrangements of 5.times5 dots.

When the X-ray film 112 is to be cut (slit) at the transverse direction intermediate portion thereof, the marking pattern MP is formed at both sides of a slit line 150 (refer to FIGS. 10B and 11) which is the position of this slitting. At this time, the marking patterns MP, which are oriented upside-down with respect to one another on either side of the slit line 150, can be formed.

When forming the marking pattern MP having high visibility on the X-ray film 112, the visibilities of the individual dots must be high. The illumination time of the laser beam LB for forming such dots is, for example, a value in the range of 1 μsec to 15 μsec when the oscillation wavelength of the laser oscillating tube 144 (the wavelength of the laser beam LB) is in the 9 μm band (e.g., a wavelength of 9.3 μm, 9.6 μm or the like). When the oscillation wavelength of the laser oscillating tube 144 is in the 10 μm band (e.g., 10.6 μm), the illumination time of the laser beam LB can be selected so as to be in the range of, for example, 5 μsec to 18 μsec.

Moreover, as the dot diameter, a value of 0.18 mm or more is often selected. At times, a value of 0.2 mm or more may be selected. At the marking head 140, in order to form such a dot diameter, the spot diameter of the laser beam LB illuminated onto the X-ray film 112 is about 0.2 mm or more.

The visibility of the marking pattern MP is affected not only by the dot diameter, but also by the dot pitch which is the central interval between the dots. In order to form the marking pattern MP having high visibility, at the marking device 110, P/D, which is the ratio of a dot pitch P with respect to a dot diameter D, is 1.5 or less.

At the marking device 110, before illuminating the laser beam LB onto the X-ray film 112, the laser oscillating tube 144 is driven, and the conveying of the X-ray film 112 is started at a predetermined timing. Each time the conveyed length of the X-ray film 112 reaches a predetermined length, the deflection signal corresponding to the pattern signal of the marking pattern MP is outputted to the beam deflector 146. The laser beam LB is thereby illuminated onto the X-ray film 112.

FIG. 12 illustrates an example of variations in the output of the laser beam LB oscillated at the laser oscillating tube 144. The laser oscillating tube 144 provided at the marking head 140 starts oscillation of the laser beam LB due to a drive signal being inputted to the laser oscillating tube 144.

At this time, the time immediately after driving of the laser oscillating tube 144 begins is the output peak of the laser beam LB. As time passes, the output decreases, and a state in which steady output Pa is outputted arises. Note that, in the present embodiment, this state of steady output of the laser oscillating tube 144 is a state in which the fluctuations in the output of the laser beam LB are less than or equal to ±3% of the steady value Pa.

When the illumination time of the laser beam LB is set such that a proper dot is formed by illuminating the laser beam LB whose output is in the steady state, if the output of the laser beam LB is high, energy which is greater than needed is supplied to the emulsion layer 116 of the X-ray film 112, and the visibility of the dot deteriorates.

Namely, at the X-ray film 112, when the output of the laser beam LB is too high, melting and transpiration of the emulsion layer 116 progress such that the base layer 114 is exposed or the like, and the visibility of the dot deteriorates.

Such a deterioration in the visibility of the dot causes, at the character or symbol formed by the dot arrangement, a deterioration in visibility due to, for example, a missing dot, and causes a deterioration in the quality of the finish.

Further, in the state of steady output, as shown in FIG. 13A, the laser beam LB illuminated onto the X-ray film 112 is a Gaussian beam which has a Gaussian distribution and whose intensity peaks at the center of the beam (the single-dot chain line in FIG. 13A). In this Gaussian beam, a line (the dashed line in FIG. 13A) at which the intensity is about 86.5% of the peak value is the beam diameter. The dot is formed on the X-ray film 112 in accordance with this beam diameter.

In contrast, in the state in which the output is unstable immediately after the start of driving of the laser oscillating tube 144, the distribution of the intensity of the laser beam LB maybe, rather than a Gaussian distribution, a distribution having, for example, plural intensity peaks as shown in FIG. 13B. Note that, in FIGS. 13A and 13B, the horizontal axis is the beam diameter direction.

When the laser beam LB which has such an intensity distribution is illuminated onto the X-ray film 112, the appropriate number of dots are not formed at the appropriate positions.

In this way, for example, when an attempt is made to form a character array such as shown in FIG. 13C on the X-ray film 112 as the marking pattern MP, as shown in FIG. 13D, there are cases in which plural dots are formed at positions which are different than the positions at which dots should be formed.

In order to prevent such a deterioration in the quality of the dots from arising, at the marking device 110, before working processing of the X-ray film 112, driving of the laser oscillating tube 144 of the marking head 140, i.e., oscillation of the laser beam LB, is started. After a preset period of time has elapsed so that the output of the laser oscillating tube 144 becomes stable, the X-ray film 112 is subjected to working processing. Namely, conveying of the X-ray film 112 is started. Further, when conveying of the X-ray film 112 is stopped and the working processing of the X-ray film 112 is interrupted or completed, the oscillation operation of the laser oscillating tube 144 is not stopped until a predetermined period of time has elapsed.

At this time, at the marking device 110, the period of time from the time that oscillation of the laser beam LB is started by the laser oscillating tube 144 to the time when conveying of the X-ray film 112 is started, is set on the basis of the period of time until the output of the laser oscillating tube 144 becomes stable.

At the marking device 110, the period of time from the time that driving of the laser oscillating tube 144 is started to the time when conveying of the X-ray film 112 is started, is set to be, for example, a period of time $T_0$ which has leeway of about 10% with respect to the period of time from the time oscillation of the laser beam LB starts at the laser oscillating tube 144 to the time when the output of the laser oscillating tube 144 reaches its steady state and is stable.

In this way, at the marking device 110, when the marking pattern MP is formed while the X-ray film 112 is being conveyed, the output of the laser beam LB illuminated onto the X-ray film 112 is in a stable state.

Further, when conveying of the X-ray film 112 is stopped, operation of the laser oscillating tube 144 is not stopped during a period of time which has even more leeway than the time $T_0$. In this way, after the roll 120 or the like has been replaced, it is possible to immediately start the working processing of the X-ray film 112.

Figure 14:
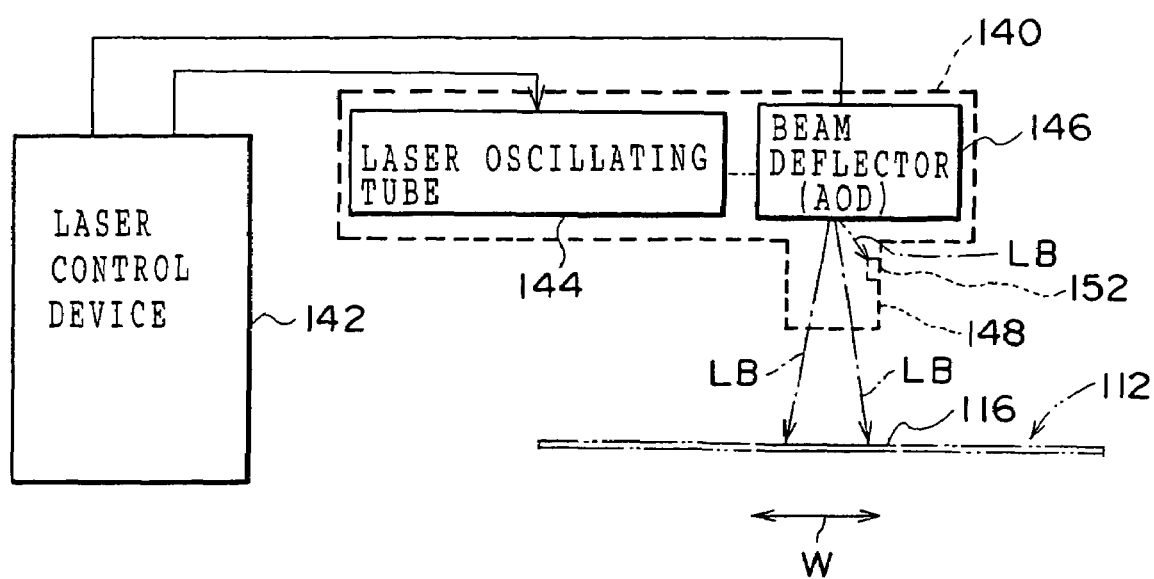
FIG. 14 is a schematic diagram of a marking head showing an illumination position of the laser beam at a time of non-marking.

As shown in FIG. 14, a damper 152, which absorbs the energy of the laser beam LB within the lens barrel 148, is provided at the marking head 140. During the time when the laser beam LB is not being illuminated onto the X-ray film 112, the laser control device 142 outputs a deflection signal to the beam deflector 146 such that the laser beam LB is illuminated onto the damper 152.

Namely, when driving of the laser oscillating tube 144 is started, the laser control device 142 outputs a deflection signal to the beam deflector 146 so that the laser beam LB is illuminated onto the damper 152. When the marking pattern MP is to be formed on the X-ray film 112, the laser control device 142 outputs a deflection signal such that the laser beam LB, which is being illuminated onto the damper 152, is illuminated onto a predetermined position of the X-ray film 112.

At this time, due to the laser control device 142 appropriately controlling the deflection signal, the illumination time of the laser beam LB is controlled such that a proper dot can be formed on the X-ray film 112.

Note that the laser oscillating tube 144 generates heat by emitting the laser beam LB. Further, the damper 152 onto which the laser beam LB is illuminated generates heat by absorbing the energy of the laser beam LB.

Thus, for example, a general structure having a cooler using a water-cooling system is provided at the marking head 140 and at the lens barrel 148 provided at the marking head 140. In this way, at the marking device 110, it is possible to prevent fluctuations in the output of the laser beam LB, offset of the deflection position of the laser beam LB, and the like, which are caused by a rise in temperature of the marking head 140, from arising.

The beam deflector 146 using an AOD deflects the laser beam LB in accordance with the ultrasonic frequency inputted as the deflection signal. At this time, at the beam deflector 146, for example, the deflection angle is changed with respect to a central frequency $f_0$ in accordance with a frequency f of the inputted deflection signal. In accordance with this change in the deflection angle, the position at which the laser beam LB is illuminated onto the X-ray film 112 changes along the transverse direction of the X-ray film 112 which is the main scanning direction.

Figure 15:
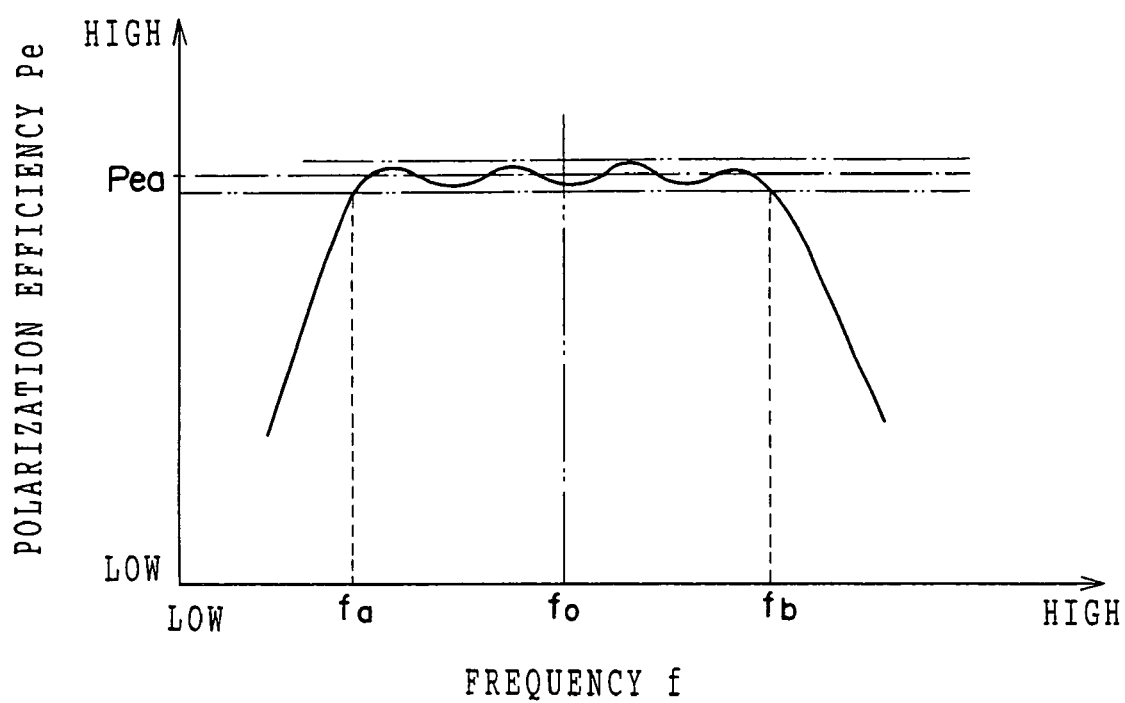
FIG. 15 is a graph showing a summary of variations in the deflection efficiency with respect to a frequency inputted as a deflection signal at a beam deflector.

FIG. 15 shows a summary of the deflection efficiency of the AOD used at the beam deflector 146, with respect to the frequency f inputted as the deflection signal. At the beam deflector 146 (the AOD), in a vicinity of the central frequency $f_0$, there are few changes in the deflection efficiency, and the frequency f is substantially flat. In contrast, when the frequency f varies greatly with respect to the central frequency $f_0$, the deflection efficiency suddenly decreases.

Such a decrease in the deflection efficiency causes damping of the laser beam LB, and it becomes difficult to form a dot having high visibility. Marking defects, such as missing dots or the like, occur.

In order to prevent such a phenomenon, in a vicinity of the central frequency $f_0$, the laser control device 142 uses a range from frequency fa to frequency fb, which are frequencies of a range (the range shown by the two-dot chain line in FIG. 15) in which the deflection efficiency Pe is for example, ±10% with respect to an average deflection efficiency Pea of a region where there is little variation in the deflection efficiency and the deflection efficiency is substantially flat. Further, the marking device 140 is provided such that the laser beam LB, which is deflected in the range of these frequencies fa to fb, is illuminated onto the region on the X-ray film 112 where the marking pattern MP is to be formed.

In this way, at the marking device 110, it is possible to form uniform dots on the X-ray film 112. Note that deflection of the laser beam LB is often carried out with the deflection efficiency Pe in a range of ±10% with respect to the average deflection efficiency Pea. A range of +10% to −30% with respect to the average deflection efficiency Pea can be used as the actual region of the deflection efficiency Pe at the time of carrying out laser marking. Therefore, it suffices to carry out settings at least such that the deflection of the laser beam LB is carried out in this range of the deflection efficiency Pe.

In the marking device 110 which is structured in this way, the marking pattern MP is formed by using the deflection signal which is based on the pattern signal. Therefore, the marking pattern MP formed on the X-ray film 112 can easily be changed by changing the pattern signal.

At the marking device 110, the marking pattern MP is formed by arrangements of dots formed by the laser beam LB which is illuminated onto the X-ray film 112. A pattern signal, which corresponds to the marking pattern MP for which recording onto the X-ray film 112 is desired, is inputted to the laser control device 142. In this way, arbitrary characters or symbols or the like can be formed as the marking pattern MP, and a portion of or all of the marking pattern MP to be formed on the X-ray film 112 can be changed easily.

Hereinafter, marking onto the X-ray film 112 by the marking device 110 will be described as the operation of the present embodiment.

Figure 16:
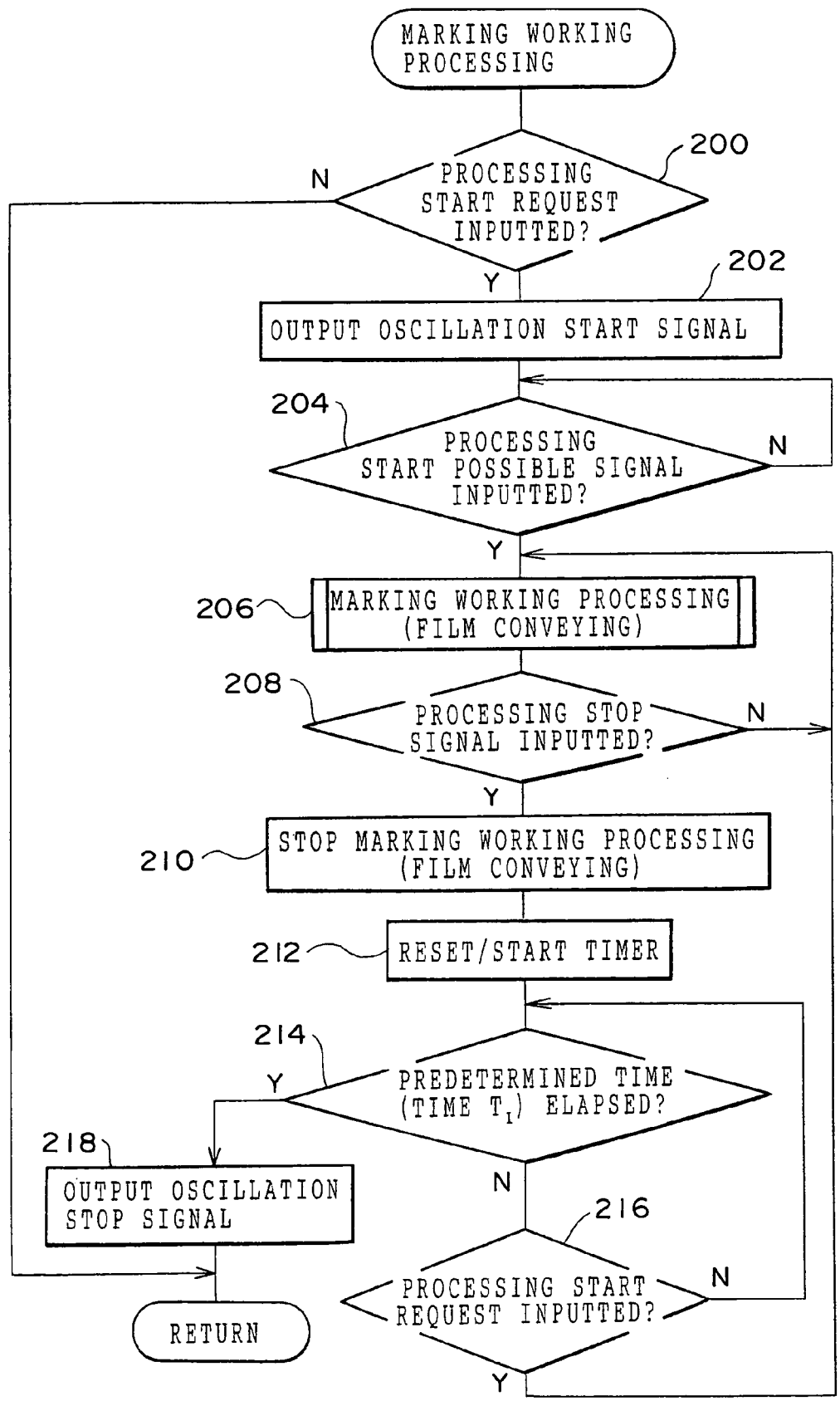
FIG. 16 is a flowchart showing an example of processings at the time when marking processing is carried out on an X-ray film.

FIG. 16 shows a summary of the processings at the time of carrying out marking processing (working processing) on the X-ray film 112 at the marking device 110.

At the marking device 110, a processing start request is inputted by, for example, marking working of the X-ray film 112 being instructed from a higher-level production control device or the like, or an operation switch being operated in a state in which the roll 120 is loaded, or the like. In this way, the determination in initial step 200 of the flowchart of FIG. 16 is affirmative, and marking working of the X-ray film 112 begins.

Due to the affirmative determination in step 200, the routine proceeds to step 202, and first, the take-up control device 138 provided at the marking device 110 outputs, to the laser control device 142, an oscillation start signal requesting operation of the laser oscillating tube 144.

Figure 17:
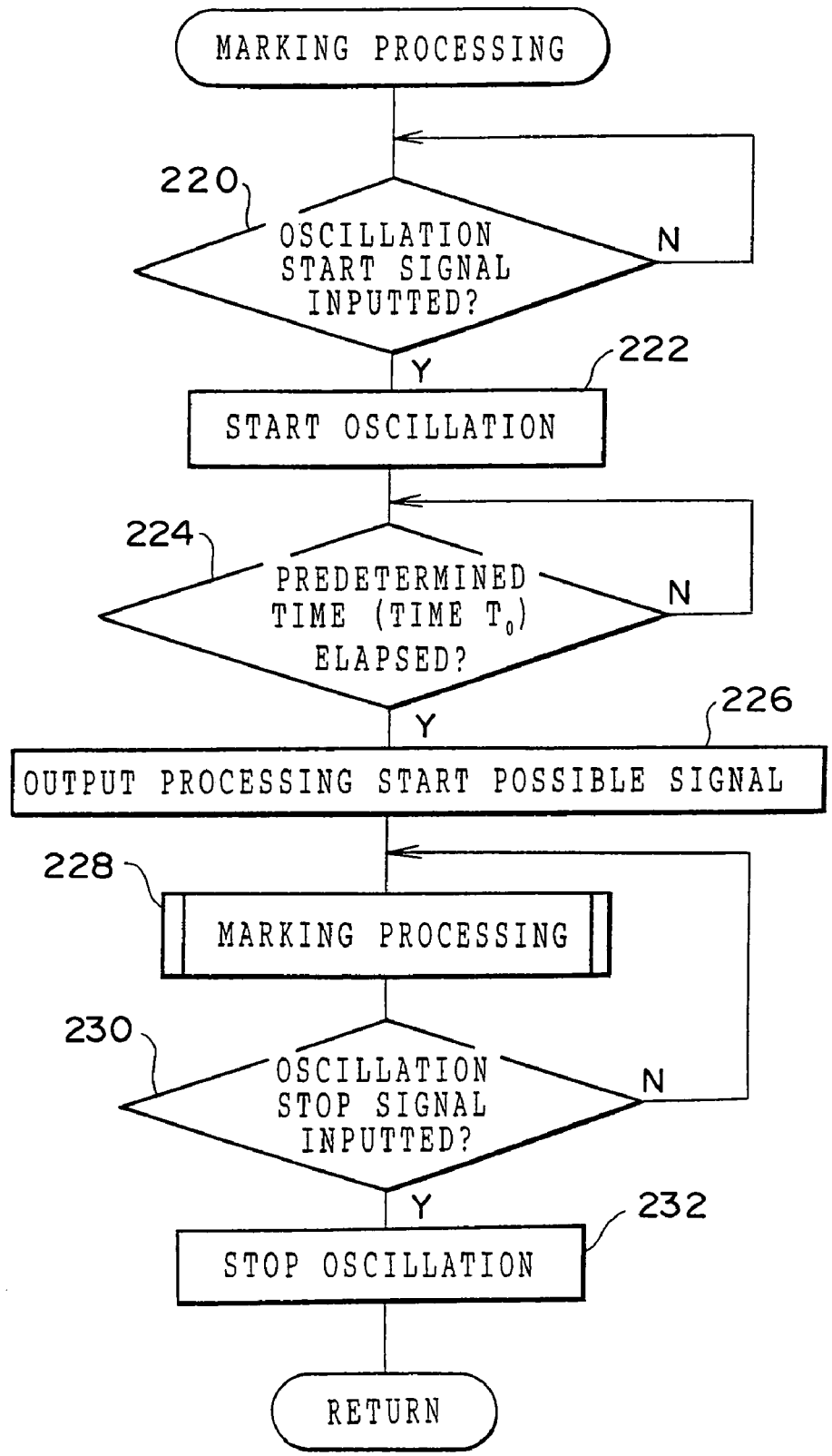
FIG. 17 is a flowchart showing an example of marking processings at a laser control device accompanying the flow of processings of FIG. 16.
Figure 22B:
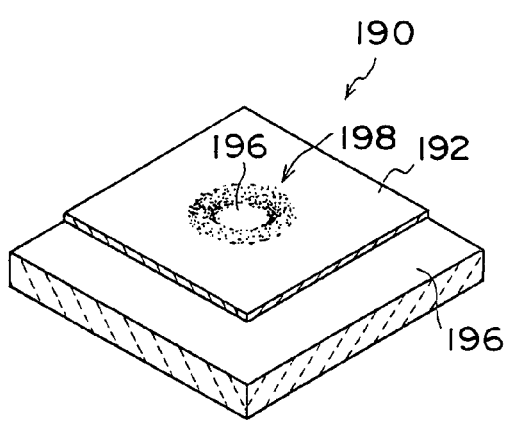
FIG. 22B is a schematic diagram showing an example of an improper dot.
Figure 22A:
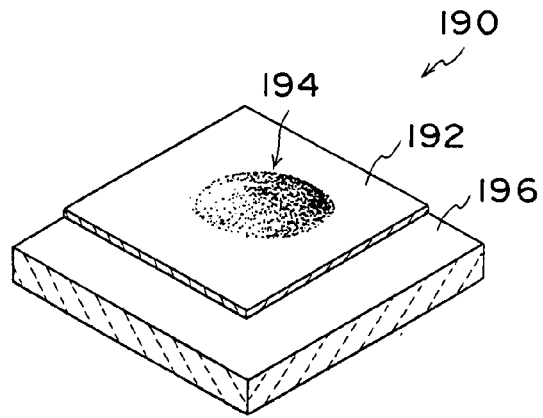
FIG. 22A is a schematic diagram showing an example of a proper dot.
Figure 23A:
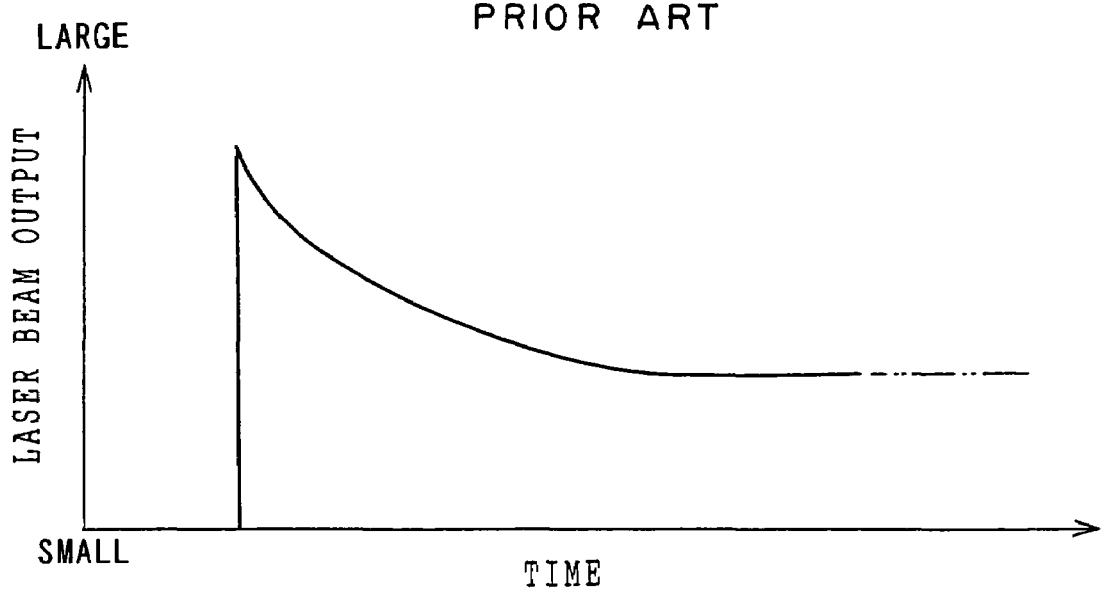
FIG. 23A is a graph showing an example of variations in output at a time when a laser oscillating tube is continuously driven.
Figure 23B:
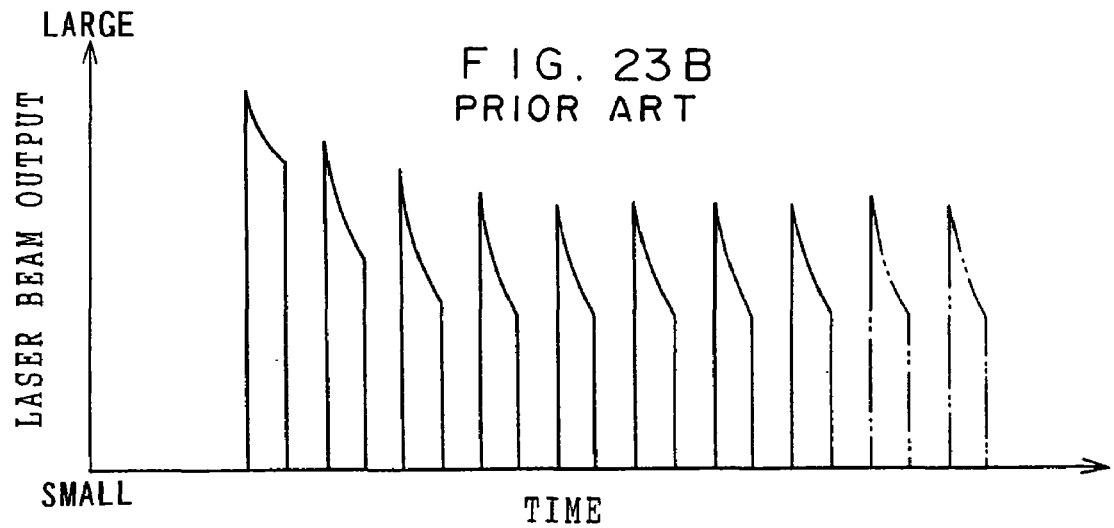
FIG. 23B is a graph showing an example of variations in output at a time when a laser oscillating tube is pulse-driven.

FIG. 17 shows a summary of the marking processings which use the marking head 140, at the laser control device 142.

In this flowchart, in initial step 220, it is confirmed whether or not an oscillation start signal has been inputted from the take-up control device 138. The determination in step 220 of this flowchart is affirmative due to the take-up control device 138 outputting an oscillation start signal to the laser control device 142 in above step 202 of FIG. 16.

In this way, the routine moves on to step 222 where a drive signal is outputted to the laser oscillator 144, and oscillation of the laser beam LB at the laser oscillator 144 begins. At this time, the laser control device 142 outputs a deflection signal to the beam deflector 146 so that the laser beam LB will be illuminated onto the damper 152 provided within the lens barrel 148.

In subsequent step 224, it is confirmed whether or a not the time which has elapsed from the start of oscillation of the laser beam LB by the laser oscillator 144 has reached the preset time $T_0$. When the elapsed time has reached the time $T_0$ and the determination in step 224 is affirmative, the routine proceeds to step 226 where a processing start signal is outputted to the take-up control device 138.

The time $T_0$ at this time is the time until the output of the laser beam LB oscillated at the laser oscillating tube 144 is stable in its steady state. From this, the laser control device 142 outputs the processing start signal to the take-up control device 138 at the time when the output of the laser beam LB is stable.

As shown in FIG. 16, when the take-up control device 138 outputs the oscillation start signal in step 202, in subsequent step 204, it is confirmed whether or not a processing start possible signal has been inputted. When the laser control device 142 outputs a signal expressing that it is possible to start processing (step 224 in FIG. 17), the judgment in step 204 is affirmative, and the routine proceeds to the next step 206. In step 206, by starting the rotational driving of the suction drum 126 and the like, conveying of the X-ray film 112 is started while the X-ray film 112 is pulled-out from the roll 120.

Namely, as shown in FIG. 18, at the marking device 110, due to the period of time $T_0$ elapsing after oscillation of the laser beam LB by the laser oscillating tube 144 is started, marking of the X-ray film 112 is possible. At this time, conveying for the working processing of the X-ray film 112 is started.

As shown in FIG. 17, when the processing start possible signal is outputted to the laser control device 142, the routine proceeds to step 228 where marking processing is carried out.

This marking processing is carried out while monitoring the conveying speed, the conveyed length, and the like of the X-ray film 112 from the output of the unillustrated rotary encoder provided at the suction drum 126. When the take-up control device 138 starts the conveying of the X-ray film 112, the laser beam LB is illuminated onto the X-ray film 112 each time the conveyed length of the X-ray film 112 reaches a predetermined length, such that the marking pattern MP is formed on the X-ray film 112 at predetermined intervals.

As shown in FIG. 19A, the laser oscillating tube 144 provided at the marking head 140 is in a state in which it continues oscillation of the laser beam LB. In this way, the output of the laser beam LB is in a stable state.

In this state, due to the conveyed length of the X-ray film 112 reaching a predetermined length, the laser control device 142 generates a marking signal (marking signal on). The laser control device 142 thereby outputs a deflection signal to the beam deflector 146 on the basis of the pattern signal of the marking pattern MP.

Due to the laser beam LB, which is being illuminated onto the damper 152, being deflected on the basis of the pattern signal of the marking pattern MP, the laser beam LB is deflected toward the X-ray film 112 and is illuminated onto the X-ray film 112.

In this way, as shown in FIG. 19B, the illumination position of the laser beam LB is deflected along the longitudinal direction of the X-ray film 112 (the direction of arrow L in FIG. 19B) which is the conveying direction (subscanning direction), and along the transverse direction of the X-ray film 112 (the direction of arrow W in FIG. 19B) which is the main scanning direction.

At this time, the laser control device 142 deflects the laser beam LB by using a region where the deflection efficiency of the beam deflector 146 (the AOD) is substantially constant. In this way, as shown in FIG. 19C, a character or the like formed by an arrangement of dots having high visibility is formed on the X-ray film 112. Note that FIGS. 19B and 19C illustrate an example in which the letter "A" is formed by an arrangement of 5×5 dots.

As shown in FIG. 16, in step 208, the take-up control device 138 confirms whether or not a predetermined stop signal has been inputted.

Here, when the determination in step 208 is affirmative due to a stop signal being inputted in order to replace the roll 120 or stop operation of the device or the like, the routine proceeds to step 210 where conveying of the X-ray film 112 is stopped. In subsequent step 212, by resetting/starting an unillustrated timer, measuring of the stopped time T is started.

In step 214, it is confirmed whether or not the stopped time T has reached a time $T_I$ which is set in advance. In step 216, it is confirmed whether or not the next processing start request has been inputted.

Here, when the stopped time T has reached the time $T_I$, the determination in step 214 is affirmative. The routine proceeds to step 218 where a signal to stop oscillation at the laser oscillating tube 144 is outputted to the laser control device 142.

As shown in FIG. 17, at the laser control device 142, while carrying out marking processing of the X-ray film 112 (step 228), it is confirmed in step 230 whether or not an oscillation stop signal has been inputted. Due to the take-up control device 138 outputting an oscillation stop signal in step 218 of FIG. 16, the determination in step 230 is affirmative. The routine moves on to step 232 where oscillation of the laser oscillating tube 144 is stopped.

In the flowchart of FIG. 16, due to a processing start signal being inputted before the stopped time T reaches the time $T_1$, the determination in step 216 is affirmative, and the routine moves on to step 206.

In this way, conveying of the X-ray film 112 is started, and marking processing accompanying the conveying of the X-ray film 112 is carried out.

Namely, as shown in FIG. 18, at the marking device 110, when the stopped time T has not reached the time $T_1$ and conveying of the X-ray film 112 is started, oscillation of the laser beam LB by the laser oscillating tube 144 is continued such that the state in which marking of the X-ray film 112 is possible is maintained.

In contrast, if the stopped time T exceeds the time $T_I$, operation of the laser oscillating tube 144 is stopped.

At the marking device 110, when the stopped time T is long, oscillation of the laser oscillating tube 144 is stopped. However, when the stopped time T is short, by continuing oscillation of the laser oscillating tube 144, it is possible to quickly begin processing of the X-ray film 112 at the time when an instruction to start processing of the X-ray film 112 is inputted.

Namely, at the marking device 110, when processing of the X-ray film 112 starts from a state in which the laser oscillating tube 144 has stopped oscillation, the start of processing is delayed until output of the laser oscillating tube 144 is stable.

Therefore, if the oscillation of the laser oscillating tube 144 is stopped each time a signal to stop processing of the X-ray film 112 is inputted, processing of the X-ray film 112 cannot be started right away even if an instruction to begin processing of the X-ray film 112 is inputted.

Thus, the time $T_I$ is set, and by stopping the oscillation of the laser oscillating tube 144 only at times when the stopped time T is long enough to exceed the time $T_I$, processing of the X-ray film 112 can be restarted rapidly when the stopped time T is short.

This time $T_I$ can be set on the basis of the time $T_0$. For example, it suffices to set the time $T_I$ to be at least longer than the time $T_0$. Moreover, the time $T_I$ may be set on the basis of the operational state of the marking device 110.

Specifically, while the marking device 110 is operating, when, for example, stoppage of about 5 minutes occurs frequently in order to replace the roll 120, it suffices to set the time $T_I$, to be at least 5 minutes or more and to be longer than the time $T_0$.

In this way, it is possible to prevent a deterioration in operational efficiency caused by the need to start up the laser oscillating tube 144 each time there is a stoppage of a relatively short time occurring frequently at the marking device 110.

In this way, at the marking device 110, when the laser beam LB, which is oscillated by the laser oscillating tube 144, is illuminated onto the X-ray film 112 and the marking pattern MP is formed on the X-ray film 112, the laser beam LB which has a stable output intensity is illuminated onto the X-ray film 112. Accordingly, high-quality dots can be formed on the X-ray film 112. The marking pattern MP which has high visibility can thereby be recorded.

Note that the above-described embodiment is not intended to limit the structure of the present invention. For example, in the present embodiment, the laser oscillating tube 144 which oscillates a $CO_2$ laser is used as the laser oscillator. However, the laser oscillator is not limited to the same. For example, any structure which emits conventionally known, arbitrary laser light, e.g., a YAG laser, can be applied.

In the present embodiment, conveying processing of the X-ray film is started on the basis of the period of time $T_0$ from the time oscillation of the laser beam LB by the laser oscillating tube 144 begins to the time that the output of the laser beam LB is stable. However, the start of processing the X-ray film 112 is not limited to this.

For example, the conveying processing of the X-ray film 112 may be started by forecasting the period of time from the start of conveying of the X-ray film 112 to the arrival of the time at which the laser beam LB is to actually be illuminated. Namely, conveying processing (working processing) of the X-ray film 112 may be started such that the laser beam LB is illuminated onto the X-ray film 112 when the time $T_0$ has elapsed from the start of the oscillation of the laser oscillating tube 144.

Further, this time $T_0$ may be set by carrying out trial printing onto the X-ray film 112 and confirming the visibility of the respective printed dots.

In the present embodiment, the time $T_0$ is set, and working processing of the X-ray film 112 is carried out on the basis of this time $T_0$. However, in the present invention, it suffices to be able to illuminate the laser beam LB onto the X-ray film 112 at the time when at least the oscillation output of the laser oscillating tube 144 is stable.

Here, for example, the laser beam LB which is oscillated by and outputted from the laser oscillating tube 144 is monitored or measured by a sensor. The working processing of the X-ray film 112 may be started at the time when it is known, from the results of monitoring or the results of measurement, that the output of the laser oscillating tube 144 is stable.

Moreover, in the present embodiment, the time $T_I$ is set on the basis of the operational state of the marking device 110 and the time $T_0$. However, the present invention is not limited to the same. For example, when the operation of the marking device 110 is managed by a higher-level production managing device (a production managing computer) or the like to which the marking device 110 is connected, driving of the laser oscillating tube 144 may be managed in accordance therewith.

Namely, when a higher-level production managing computer manages the operation of the marking device 110 in accordance with the progression of the working processing of the X-ray film 112, the computer may manage the operation in accordance with the start of oscillation and the stopping of oscillation of the laser oscillating tube 144.

Moreover, in the present embodiment, the damper 152 is provided within the lens barrel 148 of the marking head 140. By illuminating the laser beam LB onto the damper 152, at the time when the oscillation of the laser oscillating tube 144 is continued, it is possible to prevent the laser beam LB from being unnecessarily illuminated onto the X-ray film 112. However, the structure of the present invention is not limited to this structure.

For example, as shown in FIG. 20A, a mirror 154 which reflects the laser beam LB is provided on the optical path of the laser beam LB between the laser oscillating tube 144 and the beam deflector 146. A damper 156 is provided in the direction in which the laser beam LB is reflected by the mirror 154. Usually, the laser beam LB is illuminated by the mirror 154 onto the damper 156. The laser beam LB can be made incident onto the beam deflector 146 in accordance with the timing for marking the X-ray film 112.

In this way, there is no source of heat at least within the lens barrel 148, and there is no need to cool the lens barrel 148. Further, there is no need to continue to output a deflection signal to the beam deflector 146 in order to illuminate the laser beam LB onto the damper 156.

Further, as shown in FIG. 20B, a damper 158 may be provided at the exterior of the lens barrel 148, at a position which is set apart from the illumination region of the laser beam LB onto the X-ray film 112. In this way, it is possible to suppress the unnecessary generation of heat by the lens barrel 148 and the marking head 140 due to the laser beam LB, and there is no source of heat within the lens barrel 148. Therefore, there is no need to cool the lens barrel 148.

Moreover, as shown in FIGS. 21A and 21B, a damper 160 may be provided within the laser control device 142. At this time, as shown in FIG. 21A, the mirror 154 may be disposed between the laser oscillating tube 144 and the beam deflector 146, and a mirror 162 may be disposed in the direction of reflection of the laser beam LB by the mirror 154, and the laser beam LB may be illuminated onto the damper 160 provided in the laser control device 142.

In addition, as shown in FIG. 21B, by providing a mirror 164 at the exterior of the lens barrel 148 at a position which is set apart from the illumination region of the laser beam LB onto the X-ray film 112, and by illuminating the laser beam LB onto this mirror 164, the laser beam LB can be reflected toward the damper 160 provided at the laser control device 142 and can be illuminated onto the damper 160.

Generally, a power source amplifier for the laser, which generates power for driving the laser oscillating tube 144, is provided within the laser control device 110, and a cooler, such as a water-cooling system or the like which cools this power source amplifier for the laser, is provided within the laser control device 110.

Therefore, it is possible to cool the damper 160 by using the means for cooling the amplifier for the laser power source.

As described above, in the present invention, the timing for starting the working processing of the X-ray film 112 may be judged by monitoring the laser beam LB oscillated at the laser oscillating tube 144, or by measuring the output of the laser beam LB, or the like.

Therefore, a sensor, which monitors or measures the oscillation output of the laser oscillating tube 144, may be provided at the laser control device 142 instead of the damper 160. Or, a half-mirror, which reflects toward this sensor a portion of the laser beam LB illuminated onto the damper 160, or a mirror, which can reflect, toward the sensor and at an arbitrary timing, the laser beam LB illuminated onto the damper 160, may be provided.

In this way, at the laser control device 142, it is possible to monitor the laser oscillating tube 144 or measure the output of the laser oscillating tube 144. The determination of the timing for starting processing of the X-ray film 112 can be carried out on the basis of the results of measurement.

Note that, in the above-described embodiment, the X-ray film 112 which is a heat-developing photosensitive material used for medical purposes is described as an example of the photosensitive material. However, the present invention is not limited to the same, and can be applied to the laser marking of photosensitive materials of arbitrary structures.

As described above, in accordance with the present invention, at the time when a large number of dots are continuously formed by illuminating laser light while conveying a photosensitive material, the respective dots can be formed by laser light whose output is stable. Accordingly, there is the excellent effect that it is possible to form individual dots of high quality, and to record a marking pattern having high visibility on the photosensitive material.

What is claimed is:

1. A laser marking method comprising:
   starting illumination of a laser beam from a laser oscillator onto a light-photosensitive heat-developing photosensitive material having a surface layer including an emulsion layer is formed on a surface of a base layer;
   forming a cavity at an interior of the surface layer by energy of the laser beam;

forming a convex portion as a dot on a surface of the light-photosensitive heat-developing photosensitive material by completing illumination of the laser beam at a point in time when a portion illuminated by the laser beam on the surface layer is deformed into a convex shape by a cavity formed in an interior portion of the surface layer; and forming a predetermined marking pattern by the dot or an arrangement of the dots.

2. The laser marking method of claim 1, further comprising completing illumination of the laser beam when a projecting height of the convex portion which forms the dot, with respect to a top surface of the surface layer, is 10 μm or more.

3. The laser marking method of claim 2, further comprising completing illumination of the laser beam when the projecting height of the convex portion which forms the dot, with respect to the top surface of the surface layer, is in a range of 10 μm or more and 50 μm or less.

4. The laser marking method of claim 3, further comprising making an outer diameter of the dot be around 100 μm.

5. The laser marking method of claim 4, further comprising making the outer diameter of the dot be a value greater than 100 μm.

6. The laser marking method of claim 1, further comprising using an X-ray film as the light-photosensitive heat-developing photosensitive material.

7. The laser marking method of claim 6, wherein the step of forming the predetermined marking pattern includes, in a case in which the X-ray film is to be cut along a longitudinal direction and worked into one of a state of a narrow roll and a state of a narrow sheet, forming a cut line by cutting, and forming the marking pattern to have top-bottom symmetry at both sides of the cut line.

8. The laser marking method of claim 7, further comprising making respective diameters of the dots substantially uniform, and holding a conveying speed of the X-ray film substantially constant.

9. The laser marking method of claim 1, further comprising controlling an oscillation output of the laser oscillator and an illumination time of the laser beam.

10. The laser marking method of claim 9, wherein controlling the oscillation output and the illumination time of the laser beam includes a step of using a laser oscillator whose oscillation output is 100 W and whose oscillation wavelength is in a 9 μm band, and setting the illumination time of the laser beam to be in a range of 25 μsec to 35 μsec.

11. The laser marking method of claim 1, wherein the step of forming the predetermined marking pattern includes deflecting the laser beam on to the light-photosensitive heat-developing photosensitive material in a direction transverse to a conveying direction of the light-photo sensitive heat-developing photosensitive material.

12. The laser marking method of claim 11, wherein a beam deflector is utilized to deflect the laser beams.

13. The laser marking method of claim 12, wherein the beam deflector includes an acousto-optic device.

14. The laser marking method of claim 1, further comprising directing the laser beam to a damper when the laser beam is not illuminated onto the light-photosensitive heat-developing photosensitive material.

15. The laser marking method of claim 14, further comprising cooling the damper.

16. A laser marking method comprising:

starting illumination of a laser beam from a laser oscillator whose oscillation wavelength is in a 9 μm band onto a light-photosensitive heat-developing photosensitive material having a surface layer including an emulsion layer is formed on a surface of a base layer;

forming a cavity at an interior of the surface layer by energy of the laser beam;

forming a convex portion as a dot on a surface of the light-photosensitive heat-developing photosensitive material by completing illumination of the laser beam at a point in time when a portion illuminated by the laser beam on the surface layer is deformed into a convex shape by a cavity formed in an interior portion of the surface layer;

forming a predetermined marking pattern by the dot or an arrangement of the dots; and controlling an oscillation output of the laser oscillator and an illumination time of the laser beam.

17. The laser marking method of claim 16, wherein the step of forming the predetermined marking pattern includes deflecting the laser beam on to the light-photosensitive heat-developing photosensitive material in a direction transverse to a conveying direction of the light-photosensitive heat-developing photosensitive material.

18. The laser marking method of claim 17, wherein a beam deflector is utilized to deflect the laser beams.

19. The laser marking method of claim 18, wherein the beam deflector includes an acousto-optic device.

20. The laser marking method of claim 16, further comprising directing the laser beam to a damper when the laser beam is not illuminated onto the light-photosensitive heat-developing photosensitive material.

21. The laser marking method of claim 20, further comprising cooling the damper.

22. The laser marking method of claim 1, wherein a single laser oscillator is utilized to generate the laser beam.

23. The laser marking method of claim 16, wherein a single laser oscillator is utilized to generate the laser beam.

* * * * *